United States Patent
Kim et al.

(10) Patent No.: US 10,331,337 B2
(45) Date of Patent: Jun. 25, 2019

(54) FEEDBACK METHOD ACCORDING TO TOUCH LEVEL AND TOUCH INPUT DEVICE PERFORMING THE SAME

(71) Applicant: HiDeep Inc., Gyeonggi-do (KR)

(72) Inventors: Yunjoung Kim, Gyeonggi-do (KR);
Seyeob Kim, Gyeonggi-do (KR);
Hyongsub Yun, Gyeonggi-do (KR);
Sangsic Yoon, Gyeonggi-do (KR);
Bonkee Kim, Gyeonggi-do (KR);
Hojun Moon, Gyeonggi-do (KR);
Taehoon Kim, Gyeonggi-do (KR);
Sunyoung Kwon, Gyeonggi-do (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 15/484,332

(22) Filed: Apr. 11, 2017

(65) Prior Publication Data
US 2017/0220244 A1 Aug. 3, 2017

Related U.S. Application Data

(63) Continuation of application No. 14/555,751, filed on Nov. 28, 2014, now Pat. No. 9,652,097.

(30) Foreign Application Priority Data

Nov. 29, 2013 (KR) .......................... 10-2013-0147582
Nov. 29, 2013 (KR) .......................... 10-2013-0147583
(Continued)

(51) Int. Cl.
*G06F 3/01* (2006.01)
*G06F 21/00* (2013.01)
(Continued)

(52) U.S. Cl.
CPC .......... *G06F 3/04883* (2013.01); *G06F 3/016* (2013.01); *G06F 3/044* (2013.01);
(Continued)

(58) Field of Classification Search
CPC ...... G06F 3/04883; G06F 3/016; G06F 3/044; G06F 21/83; G06F 2203/04105
See application file for complete search history.

(56) References Cited

U.S. PATENT DOCUMENTS 5,559,961 A * 9/1996 Blonder .................. G06F 21/36
726/18
8,407,762 B2 * 3/2013 Bidare .................... H04L 9/321
726/2
(Continued)

FOREIGN PATENT DOCUMENTS

JP 2011501298 1/2011
JP 2011048665 3/2011
(Continued)

*Primary Examiner* — Amare Mengistu
*Assistant Examiner* — Crystal Mathews
(74) *Attorney, Agent, or Firm* — The Belles Group, P.C.

(57) ABSTRACT

In one embodiment, the invention can be a touch input device capable of unlocking a passcode accordance with a touch pressure. The device can include a touch screen which displays a passcode input window; a controller which generates a first control signal as to whether or not a touch on the passcode input window matches a predetermined passcode; and a memory which stores the predetermined passcode. The passcode input window can include a plurality of nodes which are disposed in different positions. The number of touched nodes among the plurality of nodes, the order of the touched nodes among the plurality of nodes, and a pressure level of the touch on each of the touched nodes among the plurality of nodes can be set as the predetermined
(Continued)

passcode. Further, the pressure level of the touch can be classified into at least two levels.

16 Claims, 20 Drawing Sheets

(30) Foreign Application Priority Data

| | | |
|---|---|---|
| Dec. 9, 2013 | (KR) | 10-2013-0152493 |
| Feb. 14, 2014 | (KR) | 10-2014-0017255 |
| Mar. 24, 2014 | (KR) | 10-2014-0034169 |
| Apr. 11, 2014 | (KR) | 10-2014-0043284 |
| May 9, 2014 | (KR) | 10-2014-0055732 |
| Aug. 1, 2014 | (KR) | 10-2014-0098917 |
| Sep. 19, 2014 | (KR) | 10-2014-0124920 |
| Oct. 24, 2014 | (KR) | 10-2014-0145022 |

(51) Int. Cl.

| | |
|---|---|
| *G06F 21/31* | (2013.01) |
| *G06F 21/36* | (2013.01) |
| *G06F 21/83* | (2013.01) |
| *G06F 3/044* | (2006.01) |
| *G06F 3/0488* | (2013.01) |

(52) U.S. Cl.
CPC ............ *G06F 21/00* (2013.01); *G06F 21/31* (2013.01); *G06F 21/36* (2013.01); *G06F 21/83* (2013.01); *G06F 2203/04105* (2013.01)

(56) References Cited

U.S. PATENT DOCUMENTS

| | | | | |
|---|---|---|---|---|
| 8,458,485 | B2* | 6/2013 | Bandyopadhyay | G06F 21/316 713/184 |
| 9,613,201 | B1* | 4/2017 | Dotan | G06F 21/36 |
| 2001/0024210 | A1 | 9/2001 | Armstrong | |
| 2004/0034801 | A1* | 2/2004 | Jaeger | G06F 3/0481 726/6 |
| 2005/0253817 | A1* | 11/2005 | Rytivaara | G06F 3/04883 345/173 |
| 2006/0132457 | A1 | 6/2006 | Rimas-Ribikauskas et al. | |
| 2008/0024459 | A1 | 1/2008 | Poupyrev et al. | |
| 2009/0313693 | A1* | 12/2009 | Rogers | G06F 21/36 726/21 |
| 2012/0038470 | A1 | 2/2012 | Kim et al. | |
| 2012/0159608 | A1* | 6/2012 | Griffin | G09C 5/00 726/16 |
| 2012/0159609 | A1* | 6/2012 | Griffin | G06F 21/83 726/17 |
| 2012/0183271 | A1 | 7/2012 | Forutanpour et al. | |
| 2012/0194440 | A1* | 8/2012 | Ramrattan | G06F 3/04883 345/173 |
| 2012/0204258 | A1* | 8/2012 | Lee | G06F 21/36 726/19 |
| 2012/0272288 | A1 | 10/2012 | Ashbrook et al. | |
| 2012/0304284 | A1* | 11/2012 | Johnson | H04L 9/3226 726/19 |
| 2012/0326839 | A1* | 12/2012 | Du | G06F 21/31 340/5.54 |
| 2013/0212674 | A1* | 8/2013 | Boger | G06F 21/36 726/17 |
| 2013/0347101 | A1 | 12/2013 | Wu | |
| 2014/0013414 | A1* | 1/2014 | Bruck | G06F 21/00 726/16 |
| 2014/0109010 | A1* | 4/2014 | Casey | G06F 3/04883 715/835 |
| 2015/0067824 | A1* | 3/2015 | Chatterton | G06F 3/0486 726/19 |

FOREIGN PATENT DOCUMENTS

| | | |
|---|---|---|
| JP | 2011070463 | 4/2011 |
| JP | 2012160177 | 8/2012 |
| JP | 2013131186 | 7/2013 |
| JP | 2013205986 | 10/2013 |
| KR | 1020070039113 | 4/2007 |
| KR | 1020090127544 | 12/2009 |
| KR | 1020090130784 | 12/2009 |
| KR | 1020100019808 | 2/2010 |
| KR | 1020120023339 | 3/2012 |
| KR | 1020130108604 | 10/2013 |
| KR | 1020140039871 | 4/2014 |

* cited by examiner

[Fig. 1]
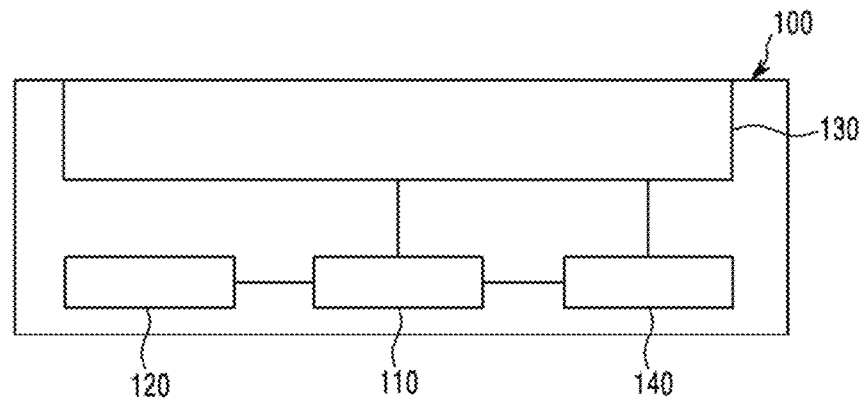
[Fig. 2a]
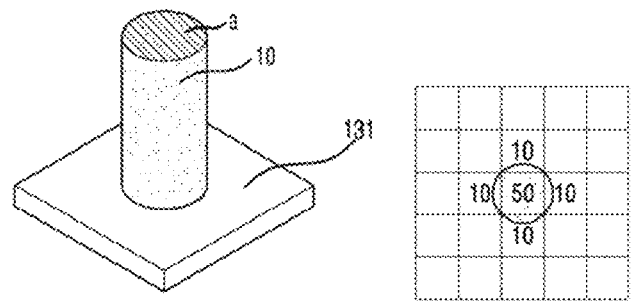
[Fig. 2b]
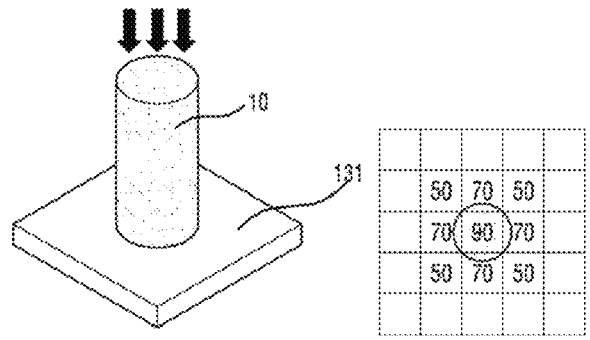

[Fig. 3a]
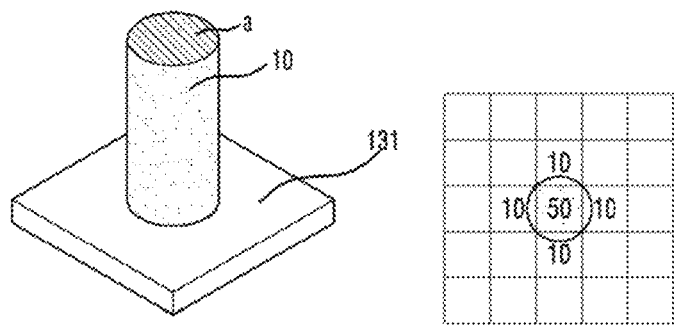
[Fig. 3b]
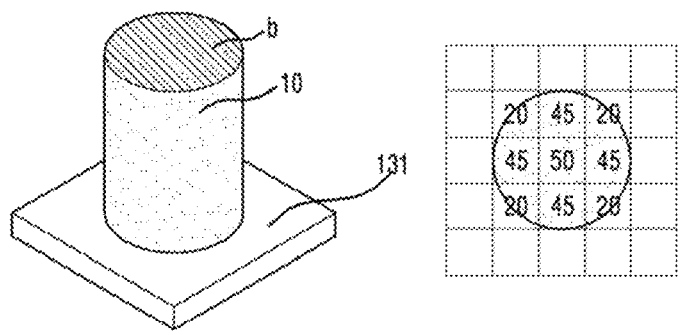
[Fig. 4a]
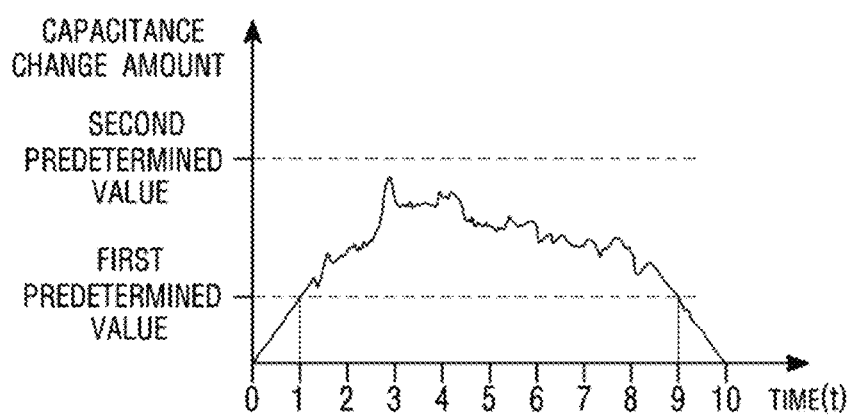

[Fig. 4b]
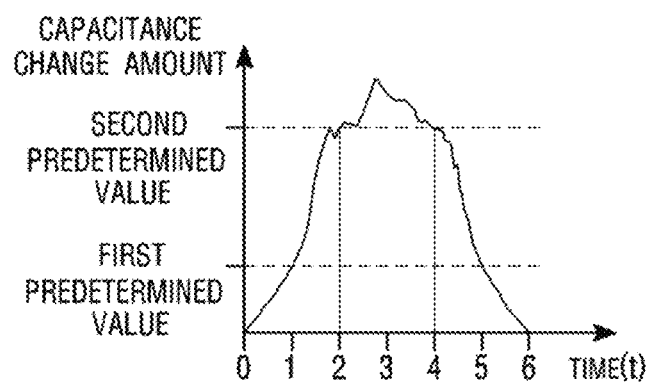
[Fig. 5]
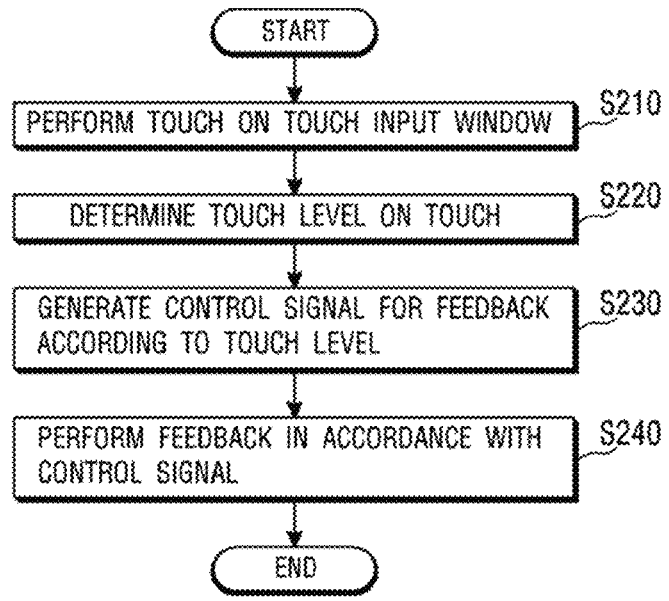

[Fig. 6a]
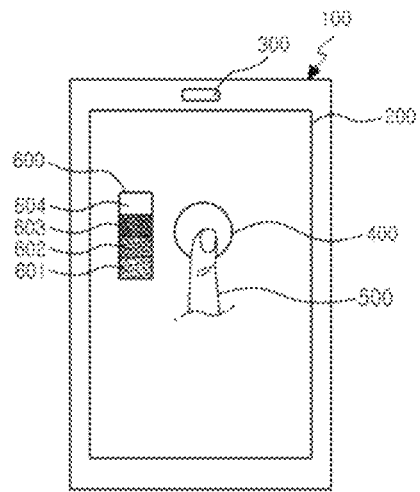
[Fig. 6b]
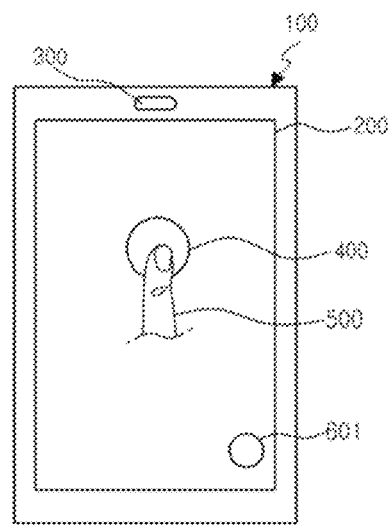

[Fig. 6c]
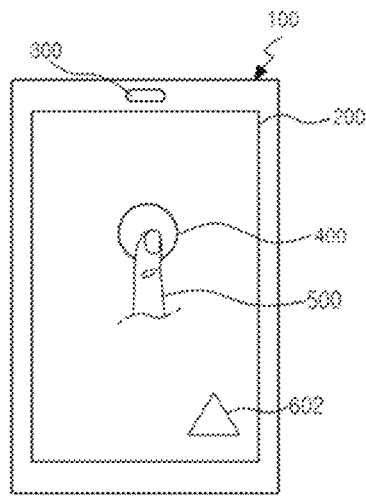
[Fig. 6d]
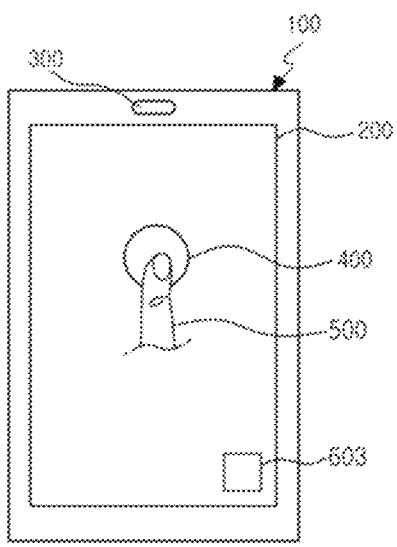

[Fig. 6e]
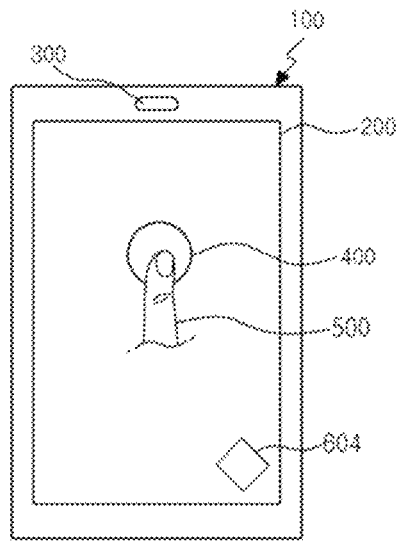
[Fig. 7a]
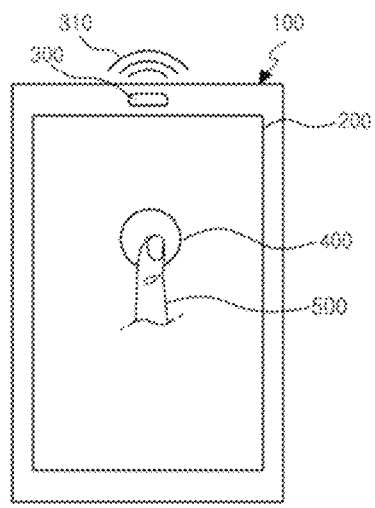

[Fig. 7b]
(1) —— —— —— — —
    LONG LONG LONG SHORT SHORT
(2) —— — —— — ——
    LONG SHORT LONG SHORT LONG
(3) — —— — —— —
    SHORT LONG SHORT LONG SHORT
(4) — — — —— ——
    SHORT SHORT SHORT LONG LONG
[Fig. 8]
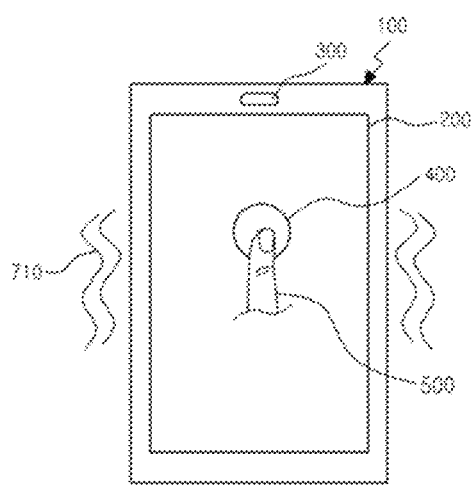

[Fig. 9a]
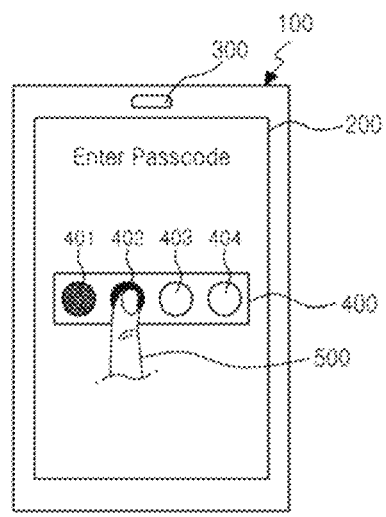
[Fig. 9b]
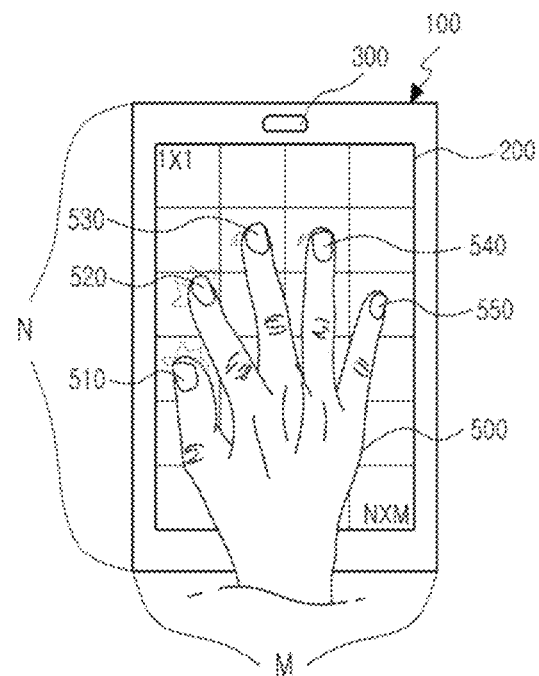

[Fig. 9c]
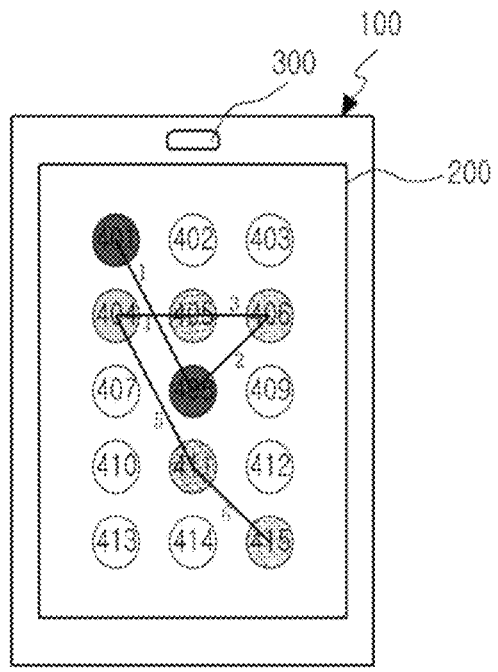
[Fig. 9d]
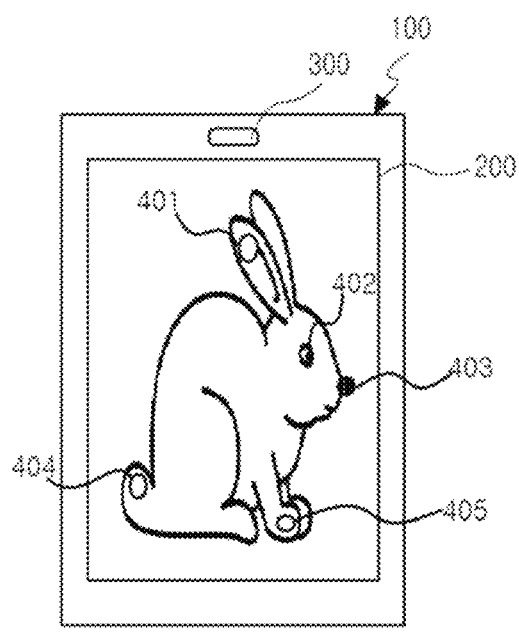

[Fig. 10]
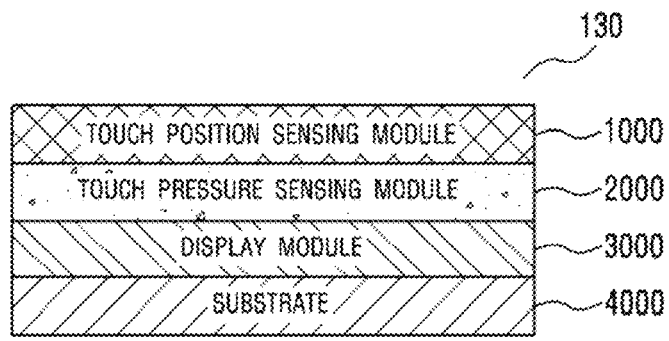
[Fig. 11a]
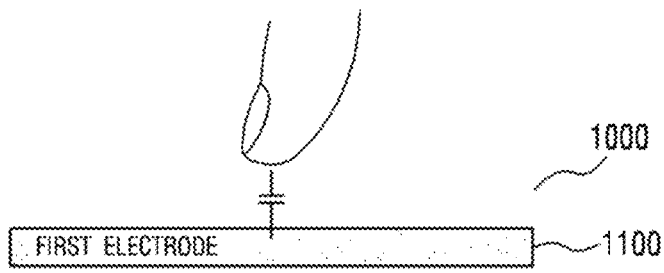
[Fig. 11b]
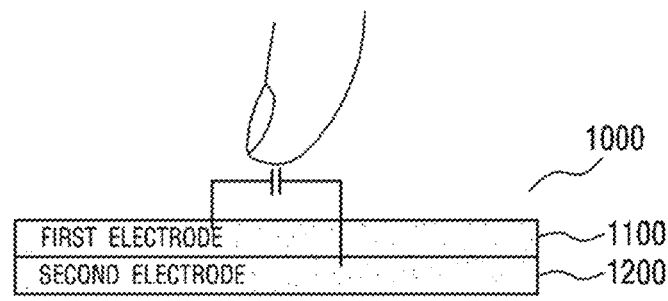

[Fig. 11c]
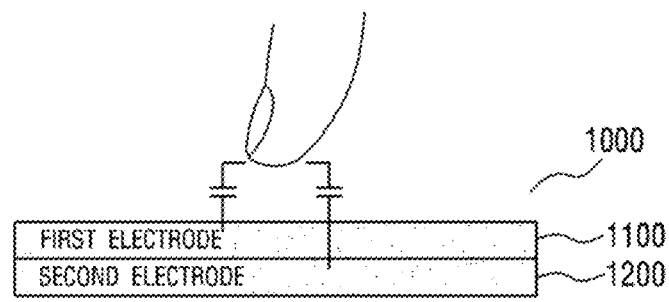
[Fig. 11d]
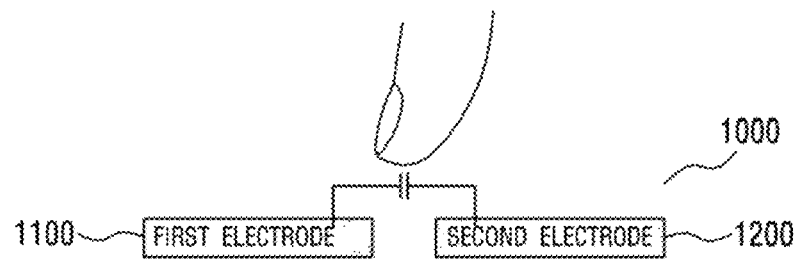
[Fig. 12a]
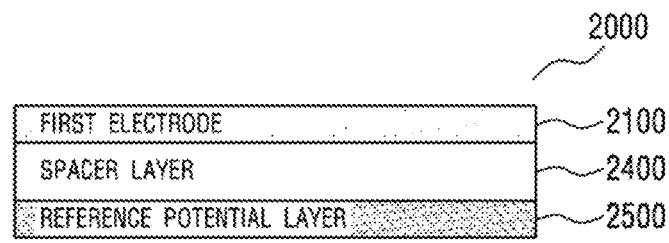

[Fig. 12b]
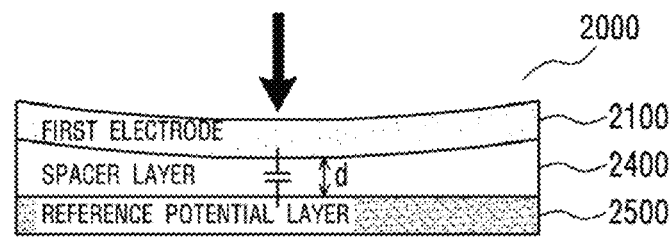
[Fig. 12c]
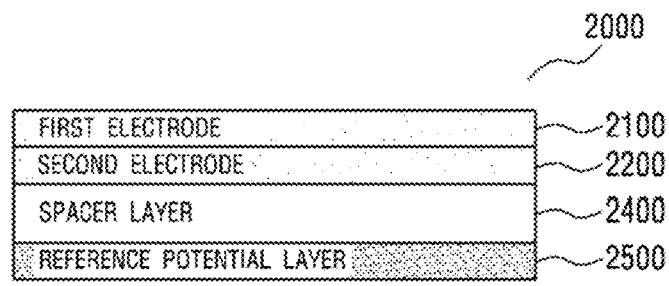
[Fig. 12d]
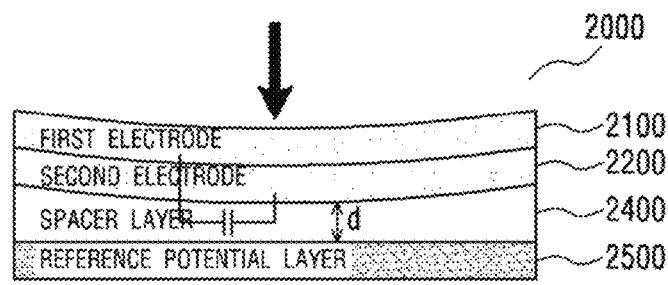

[Fig. 12e]
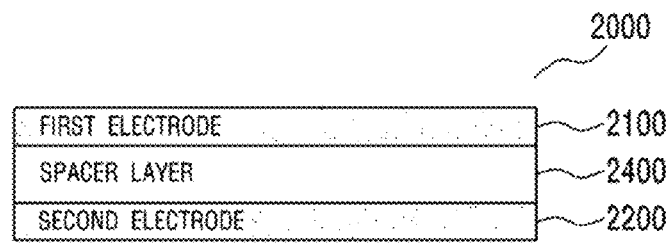
[Fig. 12f]
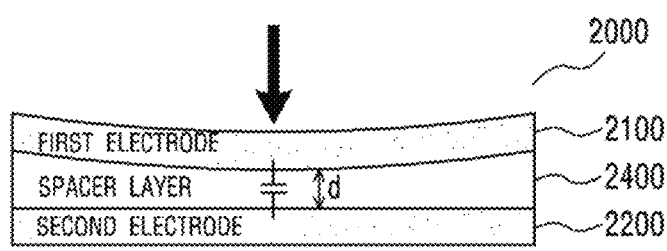
[Fig. 13]
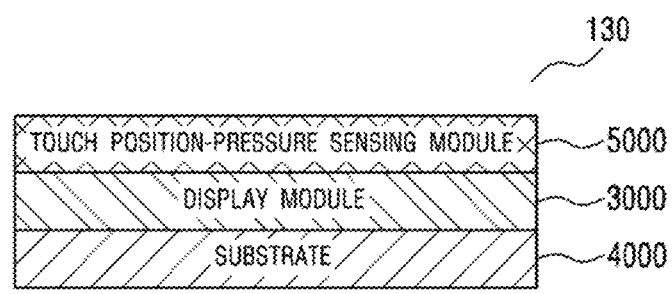
[Fig. 14a]
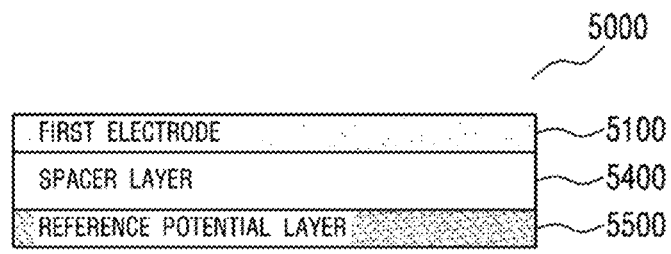

[Fig. 14b]
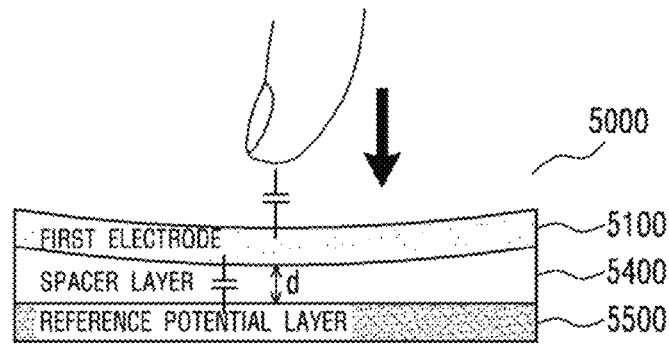
[Fig. 14c]
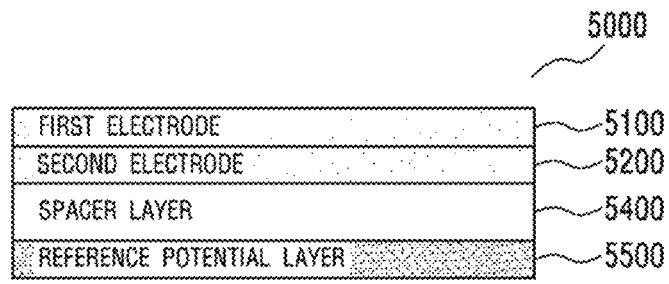
[Fig. 14d]
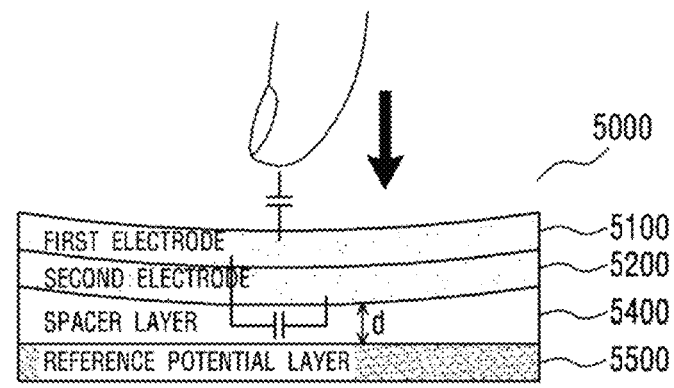

[Fig. 14e]
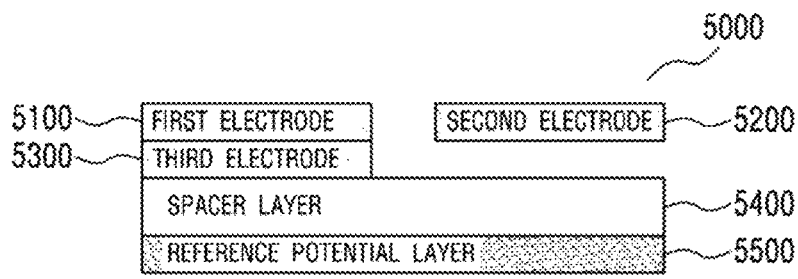
[Fig. 14f]
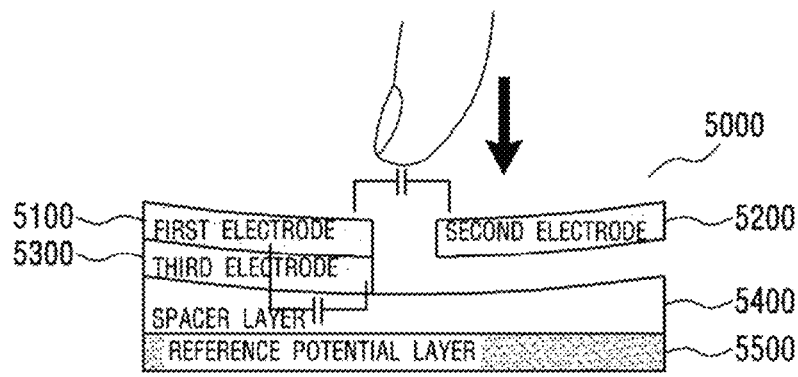
[Fig. 14g]
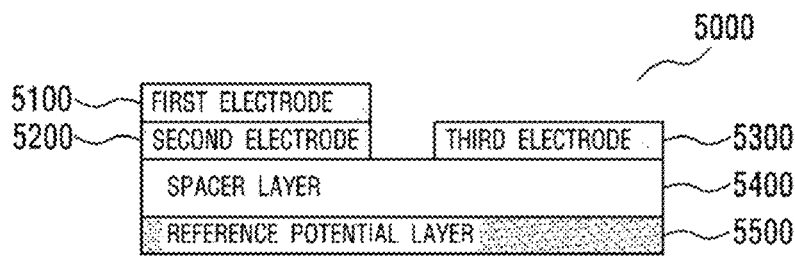

[Fig. 14h]
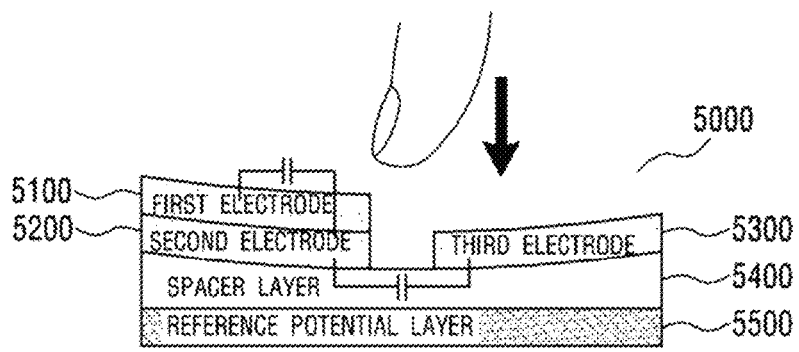
[Fig. 14i]
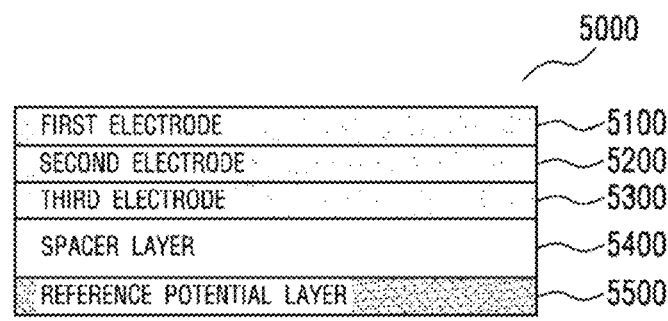
[Fig. 14j]
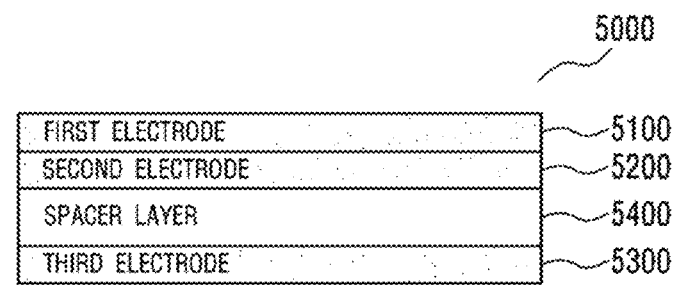

[Fig. 14k]
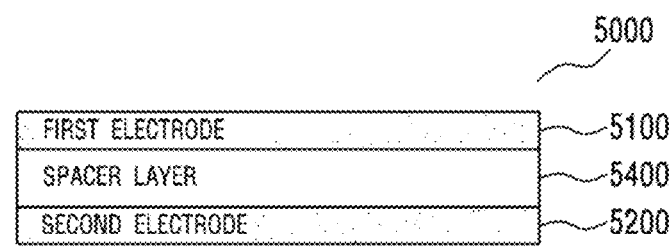
[Fig. 15]
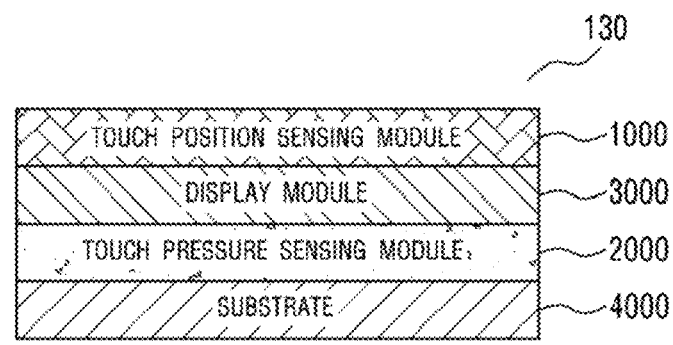
[Fig. 16a]
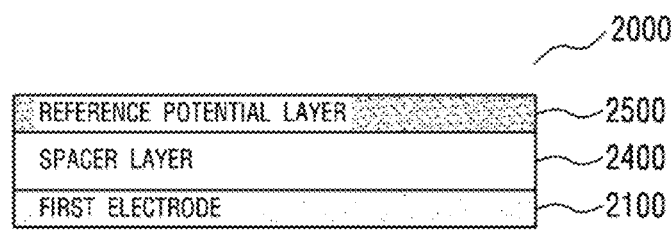

[Fig. 16b]
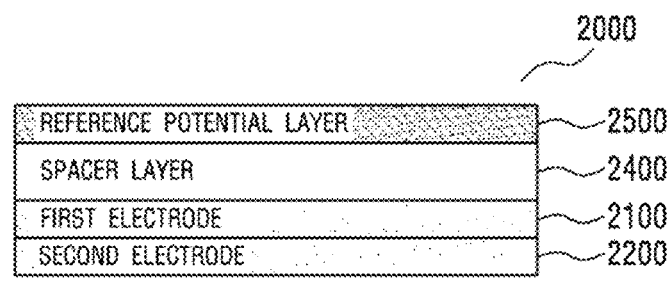
[Fig. 17a]
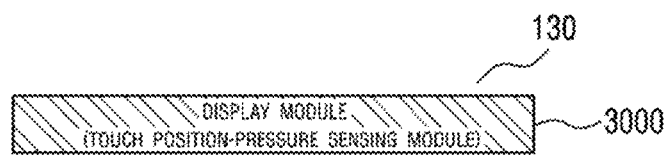
[Fig. 17b]
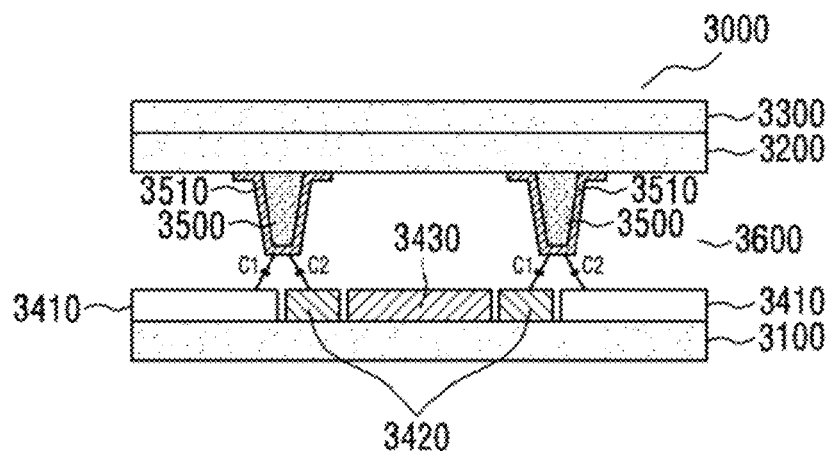

[Fig. 17c]
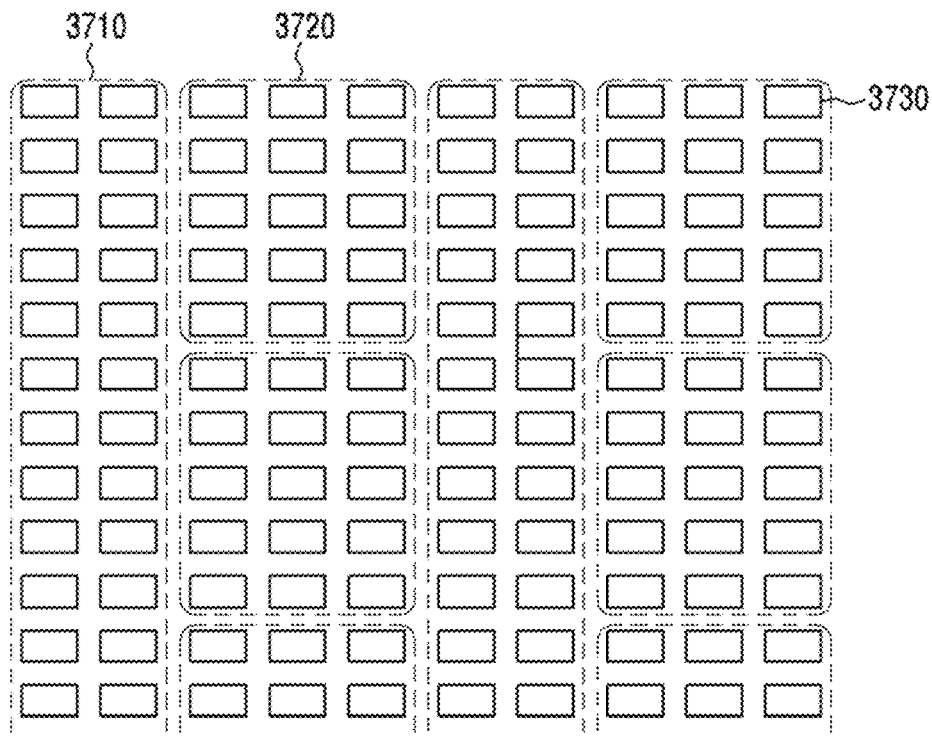
[Fig. 18a]
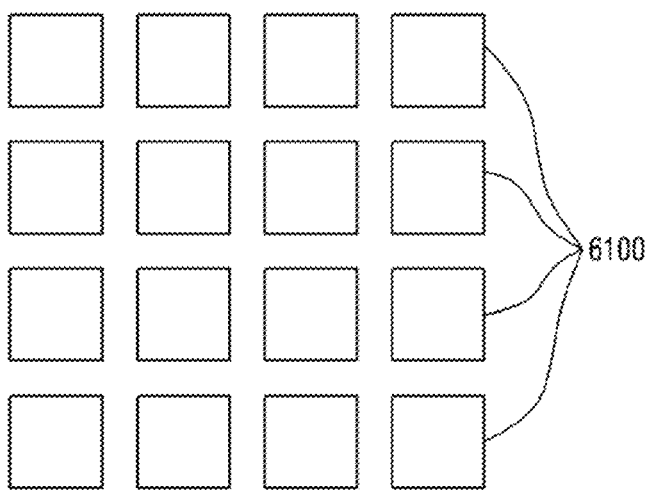

[Fig. 18b]
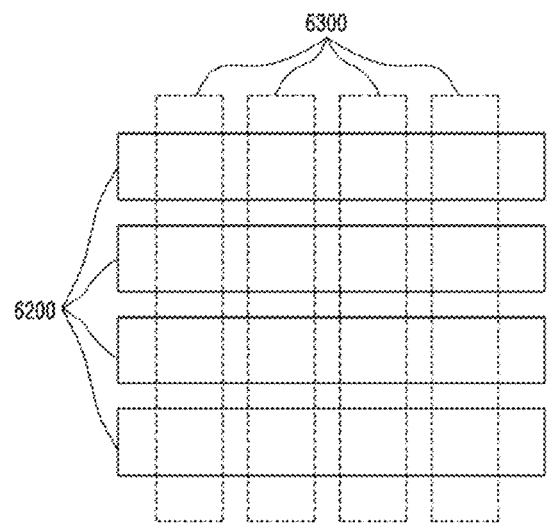
[Fig. 18c]
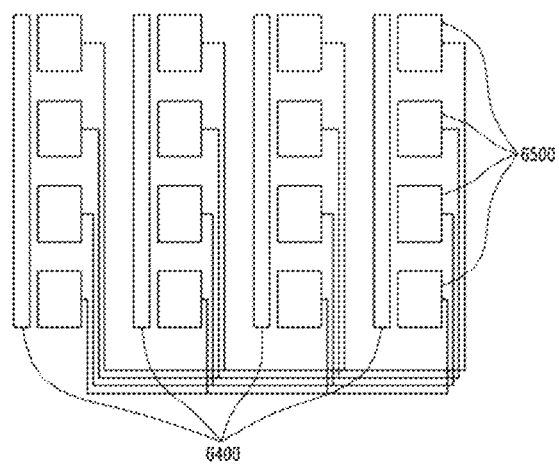
[Fig. 18d]
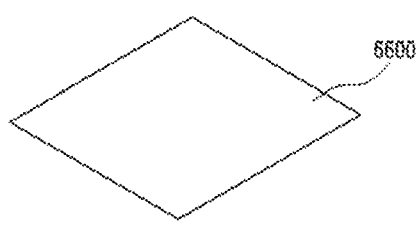

FEEDBACK METHOD ACCORDING TO TOUCH LEVEL AND TOUCH INPUT DEVICE PERFORMING THE SAME

CROSS REFERENCE TO RELATED APPLICATIONS

The present application is a continuation of U.S. patent application Ser. No. 14/555,751, filed Nov. 28, 2014, which claims priority under 35 U.S.C. § 119 to Korean Patent Application No. 10-2013-0147582, filed Nov. 29, 2013, Korean Patent Application No. 10-2013-0147583, filed Nov. 29, 2013, Korean Patent Application No. 10-2013-0152493, filed Dec. 9, 2013, Korean Patent Application No. 10-2014-0017255, filed Feb. 14, 2014, Korean Patent Application No. 10-2014-0034169, filed Mar. 24, 2014, Korean Patent Application No. 10-2014-0043284, filed Apr. 11, 2014, Korean Patent Application No. 10-2014-0055732 filed May 9, 2014, Korean Patent Application No. 10-2014-0098917, filed Aug. 1, 2014, Korean Patent Application No. 10-2014-0124920, filed Sep. 19, 2014, and Korean Patent Application No. 10-2014-0145022, filed Oct. 24, 2014.

BACKGROUND

Field

The present invention relates to a feedback method according to a touch level and a touch input device performing the same, and more particularly to a technology of supplying feedback to allow a user to cheek a touch pressure, a touch area and/or a touch time period on a touch screen, thereby making it possible to unlock the touch screen by using the feedback.

Description of Related Art

A variety of input devices are being used to operate a computing system. For example, input devices like a button, a key, a joystick and a touch screen are being used. Since the touch screen is easy and simple to operate, the touch screen is increasingly being used in operation of the computing system.

The touch screen may include a touch sensor panel which may be a transparent panel including a touch-sensitive surface. Such a touch sensor panel is attached to the front side of a display panel, and then the touch-sensitive surface may cover the visible side of the display panel. The touch screen allows a user to operate the computing system by simply touching the screen by a finger, etc. In general, the touch screen recognizes the touch on the panel and touch position, and then the computing system analyzes the touch and performs operations in accordance with the analysis.

A variety of tasks can be done by the interaction between the user and the device through the touch screen in a touch input device including the touch screen. To accomplish various tasks, there are requirements for not only whether a touch occurs or not on the touch screen but also classifying a touch level. Also, as the touch input device, especially, a computing device including the touch screen gradually has a higher performance, the user is allowed to perform financial tasks as well as private tasks by using the corresponding devices and the range of the task is now gradually expanding. Accordingly, security for the touch input device is also required to be heightened.

BRIEF SUMMARY

In one embodiment, a touch input device capable of unlocking passcode in accordance with a touch pressure is disclosed, the touch input device comprising a touch screen which displays a passcode input window; a controller which generates a first control signal as to whether or not a touch on the passcode input window matches a predetermined passcode; and a memory which stores the predetermined passcode; wherein the passcode input window comprises a plurality of nodes which are disposed in different positions; wherein the number of touched nodes among the plurality of nodes, the order of the touched nodes among the plurality of nodes, and a pressure level of the touch on each of the touched nodes among the plurality of nodes are set as the predetermined passcode; and wherein the pressure level of the touch is classified into at least two levels.

In another embodiment, a method for unlocking a passcode in a touch input device in accordance with a touch pressure is disclosed, the method comprising displaying a passcode input window on a touch screen; determining a pressure level of a touch on the passcode input window; and generating a first control signal as to whether or not the touch on the passcode input window matches a predetermined passcode; wherein the passcode input window comprises a plurality of nodes which are disposed in different positions; wherein the number of touched nodes among the plurality of nodes, the order of the touched nodes among the plurality of nodes, and the pressure level of the touch on each of the touched nodes among the plurality of nodes are set as the predetermined passcode; and wherein the pressure level of the touch is classified into at least two levels.

BRIEF DESCRIPTION OF THE DRAWINGS

FIG. 1 is a structure view of a touch input device according to an embodiment of present invention;

FIGS. 2a and 2b are views for describing the capacitance change amount due to pressure;

FIGS. 3a and 3b are views for describing the capacitance change amount due to the area;

FIGS. 4a and 4b are views for describing the touch time period;

FIG. 5 shows feedback performing steps based on a touch level on the touch screen of the touch input device according to the embodiment of the present invention;

FIGS. 6a to 6e show a feedback means and feedback method according to the touch level in accordance with a first embodiment of the present invention;

FIGS. 7a and 7b show a feedback means and feedback method according to the touch level in accordance with a second embodiment of the present invention;

FIG. 8 shows a feedback means and feedback method according to the touch level accordance with a third embodiment of the present invention;

FIGS. 9a to 9d show a process of unlocking a passcode input window in accordance with the embodiment of the present invention;

FIG. 10 shows a structure of the touch screen according to the first embodiment;

FIGS. 11a to 11d show a structure of a touch position sensing module of the touch screen according to the first embodiment;

FIGS. 12a to 12f show a structure of a touch pressure sensing module of the touch screen according to the first embodiment;

FIG. 13 shows a structure of the touch screen according to the second embodiment;

FIGS. 14a to 14k show a structure of a touch position-pressure sensing module of the touch screen according to the second embodiment;

FIG. 15 shows a structure of the touch screen according to the third embodiment;

FIGS. 16a to 16b show a structure of a touch pressure sensing module of the touch screen according to the embodiment;

FIG. 17a shows a structure of the touch screen according to a fourth embodiment;

FIGS. 17b and 17c are structure views of touch pressure sensing and touch position sensing of the touch screen according to the fourth embodiment; and FIGS. 18a to 18d are structure views showing the shape of an electrode formed in the touch sensing module according to the embodiment.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. The following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, as touch device 100 including a touch screen 130 according to the embodiment of the present invention will be described with reference to the accompanying drawings. Prior to the description of the functions and features of the touch input device 100 according to the embodiment of the present invention, the touch screen 130 included in the touch input device 100 will be described in detail with reference to FIGS. 10 to 18.

FIG. 10 shows a structure of the touch screen according to a first embodiment.

As shown in FIG. 10, the touch screen 130 may include a touch position sensing module 1000, a touch pressure sensing module 2000 disposed under the touch position sensing module 1000, a display module 3000 disposed under the touch pressure sensing module 2000, and a substrate 4000 disposed under the display module 3000. For example, the touch position sensing module 1000 and the touch pressure sensing module 2000 may be a transparent panel including a touch-sensitive surface. Hereafter, the modules 1000, 2000, 3000 and 5000 for sensing the touch position and/or touch pressure may be collectively designated as a touch sensing module.

The display module 3000 is able to display the screen to allow a user to visually check contents. Here, the display module 3000 may display by means of a display driver. The display driver (not shown) is a software allowing an operating system to manage or control a display adaptor and is a kind of a device driver.

FIGS. 11a to 11d show a structure of the touch position sensing module according to the first embodiment. FIGS. 18a to 18c are structure views showing the shape of an electrode formed in the touch position sensing module according to the embodiment.

As shown in FIG. 11a, the touch position sensing module 1000 according to the embodiment may include a first electrode 1000 formed in one layer. Here, the first electrode 1100 may be, as shown in FIG. 18a, comprised of a plurality of electrodes 6100, and then a driving signal may be input to each electrode 6100 and a sensing signal including information on self-capacitance may be output from each electrode. When an object like a user's finger approaches the first electrode 1100, the finger functions as a ground and the self-capacitance of first electrode 1100 is changed. Therefore, the touch input device 100 is able to detect the touch position by measuring the self capacitance of the first electrode 1100, which is changed as the object like the user's finger approaches the touch screen 130.

As shown in FIG. 1b, the touch position sensing module 1000 according to the embodiment may include the first electrode 1100 and a second electrode 1200, which are formed on different layers.

Here, the first and the second electrodes 1100 and 1200 are, as shown in FIG. 18b, comprised of a plurality of first electrodes 6200 and a plurality of second electrodes 6300 respectively. The plurality of first electrodes 6200 and the plurality of second electrodes 6300 may be arranged to cross each other. A driving signal may be input to any one of the first electrode 6200 and the second electrode 6300, and a sensing signal including information on mutual capacitance may be output from the other. As shown in FIG. 11b, when the object like the user's finger approaches the first electrode 1100 and the second electrode 1200, the finger functions as a ground, so that the mutual capacitance between the first electrode 1100 and the second electrode 1200 is changed. In this case, the touch input device 100 measures the mutual capacitance between the first electrode 1100 and the second electrode 1200, which is changed with the approach of the object like the user's finger to the touch screen 130, and then detects the touch position. Also, the driving signal may be input to the first electrode 6200 and the second electrode 6300, and a sensing signal including information on the self-capacitance may be output from the first and second electrodes 6200 and 6300 respectively. As shown in FIG. 11c, when the object like the user's finger approaches the first electrode 1100 and the second electrode 1200, the finger functions as a ground, so that the self-capacitance of each of the first and second electrodes 1100 and 1200 is changed. In this case, the touch input device 100 measures the self-capacitances of the first electrode 1100 and the second electrode 1200, which is changed with the approach of the object like the user's finger to the touch screen 130, and then detects the touch position.

As shown in FIG. 11d, the touch position sensing module 1000 according to the embodiment may include the first electrode 1100 formed in one layer and the second electrode 1200 formed in the same layer as the layer in which the first electrode 1100 has been formed.

Here, the first and the second electrodes 1100 and 1200 are, as shown in FIG. 18c, comprised of a plurality of first electrodes 6400 and a plurality of second electrodes 6500 respectively. The plurality of first electrodes 6400 and the plurality of second electrodes 6500 may be arranged without crossing each other and may be arranged such that the plurality of second electrodes 6500 are connected to each other in a direction crossing the extension direction of the first electrodes 6400. A principle of detecting the touch position by using the first electrode 6400 or the second electrode 6500 shown in FIG. 11d is the same as that of the foregoing referring to FIG. 11c, and thus a description of the principle will be omitted.

FIGS. 12a to 12f show a structure of the touch pressure sensing module according to the first embodiment. FIGS. 18a to 18d are structure views showing the shape of the electrode formed in the touch pressure sensing module 2000 according to the embodiment.

As shown in FIGS. 12*a* to 12*f*, the touch pressure sensing module 2000 according to the first embodiment may include a spacer layer 2400. The spacer layer 2400 may be implemented by an air gap. The spacer may be comprised of an impact absorbing material according to the embodiment and may be also filled with a dielectric material according to the embodiment.

As shown in FIGS. 12*a* to 12*d*, the touch pressure sensing module 2000 according to the first embodiment may include a reference potential layer 2500. The reference potential layer 2500 may have any potential. For example, the reference potential layer may be a ground layer having a ground potential. Here, the reference potential layer may include a layer which is parallel with a two-dimensional plane in which a below-described first electrode 2100 for sensing the touch pressure has been formed or a two-dimensional plane in which a below-described second electrode 2200 for sensing the touch pressure has been formed. Although it has been described in FIGS. 12*a* to 12*d* that the touch pressure sensing module 2000 includes the reference potential layer 2500, there is no limit to this. The touch pressure sensing module 2000 does not include the reference potential layer 2500, and the display module 3000 or the substrate 4000 which is disposed wider the touch pressure sensing module 2000 may function as the reference potential layer.

As shown in FIG. 12*a*, the touch pressure sensing module 2000 according to the embodiment may include the first electrode 2100 formed in one layer, the spacer layer 2400 formed under the layer in which the first electrode 2100 has been formed, and the reference potential layer 2500 formed under the spacer layer 2400.

Here, the first electrode 2100 is, as shown in FIG. 18*a*, comprised of the plurality of electrodes 6100. Then, the driving signal may be input to each of the electrodes 6100 and the sensing signal including information on the self-capacitance may be output from each electrode. When a pressure is applied to the touch screen 130 by the object like the user's finger or stylus, the first electrode 2100 is, as shown in FIG. 12*b*, curved at least at the touch position, so that a distance "d" between the first electrode 2100 and the reference potential layer 2500 is changed, and thus, the self-capacitance of the first electrode 2100 is changed. Accordingly, the touch input device 100 is able to detect the touch pressure by measuring the self-capacitance of the first electrode 2100, which is changed by the pressure that the object like the user's finger or stylus applies to the touch screen 130. As such, since the first electrode 2100 is comprised of the plurality of electrodes 6100, the touch input device 100 is able to detect the pressure of each of multiple touches which have been simultaneously input to the touch screen 130. Also, when there is no requirement for detecting the pressure of each of multiple touches, it is only required to detect overall pressure applied to the touch screen 130 irrespective of the touch position. Therefore, the first electrode 2100 of the touch pressure sensing module 2000 may be, as shown in FIG. 18*d*, comprised of one electrode 6600.

As shown in FIG. 12*c*, the touch pressure sensing module 2000 according to the embodiment may include the first electrode 2100, the second electrode 2200 formed under the layer in which the first electrode 2100 has been formed, the spacer layer 2400 formed under the layer in which the second electrode 2200 has been formed, and the reference potential layer 2500 formed under the spacer layer 2400.

Here, the first electrode 2100 and the second electrode 2200 may be configured and arranged as shown in FIG. 18*b*.

A driving signal is input to any one of the first electrode 6200 and the second electrode 6300, and a sensing signal including information on the mutual capacitance may be output from the other. When a pressure is applied to the touch screen 130, the first electrode 2100 and the second electrode 2200 are, as shown in FIG. 12*d*, curved at least at the touch position, so that a distance "d" between the reference potential layer 2500 and both the first electrode 2100 and the second electrode 2200 is changed, and thus, the mutual capacitance between the first electrode 2100 and the second electrode 2200 is changed. Accordingly, the touch input device 100 is able to detect the touch pressure by measuring the mutual capacitance between the first electrode 2100 and the second electrode 2200, which is changed by the pressure that is applied to the touch screen 130. As such, first electrode 2100 and the second electrode 2200 are comprised of the plurality of first electrodes 6200 and the plurality of second electrodes 6300 respectively, the touch input device 100 is able to detect the pressure of each of multiple touches which have been simultaneously input to the touch screen 130. Also, when there is no requirement for detecting the pressure of each of multiple touches, at least one of the first electrode 2100 and the second electrode 2200 of the touch pressure sensing module 2000 may be, as shown in FIG. 18*d*, comprised of the one electrode 6600.

Here, even when the first electrode 2100 and the second electrode 2200 are formed in the same layer, the touch pressure can be also detected as described in FIG. 12*c*. The first electrode 2100 and the second electrode 2200 may be configured and arranged as shown in FIG. 18*c*, or may be comprised of the one electrode 6600 as shown in FIG. 18*d*.

As shown in FIG. 12*e*, the touch pressure sensing module 2000 according to the embodiment may include the first electrode 2100 formed in one layer, the spacer layer 2400 formed under the layer in which the first electrode 2100 has been formed, and the second electrode 2200 formed under the spacer layer 2400.

In FIG. 12*e*, the configuration and operation of the first electrode and the second electrode 2200 are the same as those of the foregoing referring to FIG. 12*c*, and thus, a description of the configuration and operation will be omitted. When a pressure is applied to the touch screen 130, the first electrode 2100 is, as shown in FIG. 12*f*, curved at least at the touch position, so that a distance "d" between the first electrode 2100 and the second electrode 2200 is changed, and thus, the mutual capacitance between the first electrode 2100 and the second electrode 2200 is changed. Accordingly, the touch input device 100 is able to detect the touch pressure by measuring the mutual capacitance between the first electrode 2100 and the second electrode 2200.

As shown in FIG. 13, a touch screen 130 according to a second embodiment may include a touch position-pressure sensing module 5000, a display module 3000 disposed under the touch position-pressure sensing module 5000, and a substrate 4000 disposed under the display module 3000.

Unlike the embodiment shown in FIG. 10, the touch position-pressure sensing module 5000 according to the embodiment shown in FIG. 13 includes at least one electrode for sensing the touch position, and at least one electrode for sensing the touch pressure. At least one of the electrodes is used to sense both the touch position and the touch pressure. As such, the electrode for sensing the touch position and the electrode for sensing the touch pressure are shared, so that it is possible to reduce the manufacturing cost of the touch position-pressure sensing module, to reduce the overall thickness of the touch screen 130 and to simplify the manufacturing process. In the sharing of the electrode for sensing the touch position and the electrode for sensing the touch pressure, when it is necessary to distinguish between the sensing signal including information on the touch position and the sensing signal including information on the touch pressure, it is possible to distinguish and sense the touch position and the touch pressure by differentiating a frequency of the driving signal for sensing the touch position from a frequency of the driving signal for sensing the touch pressure, or by differentiating a time interval for sensing the touch position from a time interval fox sensing the touch pressure.

FIGS. 14a to 14k show a structure of the touch position-pressure sensing module according to the second embodiment. As shown in FIGS. 14a to 14k, the touch position-pressure sensing module 5000 according to the second embodiment may include a spacer layer 5400.

As shown in FIGS. 14a to 14i, the touch position pressure sensing module 5000 according to the embodiment may include a reference potential layer 5500. The reference potential layer 5500 is the same as that of the foregoing referring to FIGS. 12a to 12d, and thus, a description of the reference potential layer 5500 will be omitted. The reference potential layer may include a layer which is parallel with a two-dimensional plane in which a below-described first electrode 5100 for sensing the touch pressure has been formed, a two-dimensional plane in which a below-described second electrode 5200 for sensing the touch pressure has been formed, or a two-dimensional plane in which a below-described third electrode 5300 for sensing the touch pressure has been formed.

As shown in FIG. 14a, the touch position-pressure sensing module 5000 according to the embodiment may include the first electrode 5100 formed in one layer, the spacer layer 5400 formed under the layer in which the first electrode 5100 has been thrilled, and the reference potential layer 5500 formed under the spacer layer 5400.

A description of the configuration of FIGS. 14a and 14b is similar to the description referring to FIGS. 12a and 12b. Hereafter, only the difference between them will be described. As shown in FIG. 14b, when the object like the user's finger approaches the first electrode 5100 the finger functions as a ground and the touch position can be detected by the change of the self-capacitance of the first electrode 5100. Also, when a pressure is applied to the touch screen 130 by the object, a distance "d" between the first electrode 5100 and the reference potential layer 5500 is changed, and thus, the touch pressure can be detected by the change of the self-capacitance of the first electrode 5100.

As shown in FIG. 14c, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the reference potential layer 5500 formed under the spacer layer 5400.

A description of the configuration of FIGS. 14c to 14f is similar to the description referring to FIGS. 12c and 12d. Hereafter, only the difference between them will be described. Here, the first electrode 5100 and the second electrode 5200 may be, as shown in FIG. 18a, comprised of the plurality of electrodes 6100 respectively. As shown in FIG. 14d, when the object like the user's finger approaches the first electrode 5100, the finger functions as a ground and the touch position can be detected by the change of the self-capacitance of the first electrode 5100. Also, when a pressure is applied to the touch screen 130 by the object, a distance "d" between the reference potential layer 5500 and both the first electrode 5100 and the second electrode 5200 is changed, and thus, the touch pressure can be detected by the change of the mutual capacitance between the first electrode 5100 and the second electrode 5200.

Also, according to the embodiment, each of the first and second electrodes 5100 and 5200 may be, as shown in FIG. 18b, comprised of the plurality of first electrodes 6200 and the plurality of second electrodes 6300. The plurality of first electrodes 6200 and the plurality of second electrodes 6300 may be arranged to cross each other. Here, the touch position can be detected by the change of the mutual capacitance between the first electrode 5100 and the second electrode 5200, and the touch pressure can be detected by the change of the self-capacitance of the second electrode 5200 according to the change of a distance "d" between the second electrode 5200 and the reference potential layer 5500. Also, according to the embodiment, the touch position can be detected by the change of the mutual capacitance between the first electrode 5100 and the second electrode 5200, and also, the touch pressure can be detected by the change of the mutual capacitance between the first electrode 5100 and the second electrode 5200 according to the change of the distance "d" between the reference potential layer 5500 and both the first electrode 5100 and the second electrode 5200.

Here, even when the first electrode 5100 and the second electrode 5200 are formed in the same layer, the touch position and touch pressure can be also detected as described with reference to FIGS. 14c and 14d. However, in FIGS. 14c and 14d, regarding the embodiment where the electrode should be configured as shown in FIG. 18b, when the first electrode 5100 and the second electrode 5200 are formed in the same layer, the first electrode 5100 and the second electrode 5200 may be configured as shown in FIG. 18c.

As shown in FIG. 14e, the touch position-pressure sensing module 5000 according to the embodiment may include the first electrode 5100 and the second electrode 5200 which have been in the same layer, the third electrode 5300 which has been formed in a layer under the layer in which the first electrode 5100 and the second electrode 5200 have been formed, the spacer layer 5400 formed under the layer in which the third electrode 5300 has been formed, and the reference potential layer 5500 formed under the spacer layer 5400.

Here, the first electrode 5100 and the second electrode 5200 may be configured and arranged as shown in FIG. 18c, and the first electrode 5100 and the third electrode 5300 may be configured and arranged as shown in FIG. 18b. As shown in FIG. 14f, when the object like the user's finger approaches the first electrode 5100 and the second electrode 5200, the mutual capacitance between the first electrode 5100 and the second electrode 5200 is changed, so that the touch position can be detected. When a pressure is applied to the touch screen 130 by the object, a distance "d" between the reference potential layer 5500 and both the first electrode 5100 and the third electrode 5300 is changed, and then the mutual capacitance between the first electrode 5100 and the third electrode 5300 is hereby changed, so that the touch pressure can be detected. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

As shown in FIG. 14g, the touch position-pressure sensing module 5000 according to the embodiment may include the first electrode 5100 formed in one layer, the second electrode 5200 formed in a layer under the layer in which the first electrode 5100 has been formed, the third electrode 5300 formed in the same layer as the layer in which the second electrode 5200 has been formed, the spacer layer 5400 formed under the layer in which the second electrode 5200 and the third electrode 5300 have been formed, and the reference potential layer 5500 formed under the spacer layer 5400.

Here, the first electrode 5100 and the second electrode 5200 may be configured and arranged as shown in FIG. 18*b*, and the second electrode 5200 and the third electrode 5300 may be configured and arranged as shown in FIG. 18*c*. In FIG. 14*h*, the touch position can be detected by the change of the mutual capacitance between the first electrode 5100 and the second electrode 5200, and the touch pressure can be detected by the change of the mutual capacitance between the second electrode 5200 and the third electrode 5300. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

As shown in FIG. 14*i*, the touch position-pressure sensing module 5000 according to the embodiment may include the first electrode 5100 formed in one layer, the second electrode 5200 formed in a layer under the layer in which the first electrode 5100 has been formed, the third electrode 5300 formed under the layer in which the second electrode 5200 has been formed, the spacer layer 5400 formed under the layer in which the third electrode 5300 has been formed, and the reference potential layer 5500 formed under the spacer layer 5400.

Here, the first electrode 5100 and the second electrode 5200 may be configured and arranged as shown in FIG. 18*b*, and the second electrode 5200 and the third electrode 5300 may be also configured and arranged as shown in FIG. 18*b*. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch screen 130 by the object, a distance "d" between the reference potential layer 5500 and both the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

As shown in FIG. 14*j*, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the third electrode 5300 formed under the spacer layer 5400.

Here, the first electrode 5100 and the second electrode 5200 may be configured and arranged as shown in FIG. 18*b*, and the third electrode 5300 may be configured as shown in FIG. 18*a* or the second electrode 5200 and the third electrode 5300 may be also configured and arranged as shown in FIG. 18*b*. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch screen 130 by the object, a distance "d" between the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

As shown in FIG. 14*k*, the touch position-pressure sensing module 5000 according to the embodiment may include the first electrode 5100 formed in one layer, the spacer layer 5400 formed under the layer in which the first electrode 5100 has been formed, and the second electrode 5200 formed under the spacer layer 5400.

Here, the first electrode 5100 and the second electrode 5200 may be configured and arranged as shown in FIG. 18*b*. Here, the touch position can be detected by the change of the mutual capacitance between the first electrode 5100 and the second electrode 5200. Also, when a pressure is applied to the touch screen 130 by the object, a distance "d" between the first electrode 5100 and the second electrode 5200 is changed, so that the touch pressure can be detected by the change of the mutual capacitance between the first electrode 5100 and the second electrode 5200. The first electrode 5100 and the second electrode 5200 may be configured and arranged as shown in FIG. 18*a*. Here, when the object like the user's finger approaches the first electrode 5100, the finger functions as a ground and the self-capacitance of the first electrode 5100 is changed, so that the touch position can be detected. Also, the touch pressure can be detected by the change of the mutual capacitance between the first electrode 5100 and the second electrode 5200.

As shown in FIG. 15, a touch screen 130 according to a third embodiment may include the touch position sensing module 1000, the display module 3000 disposed under the touch position sensing module 1000, the touch pressure sensing module 2000 disposed under the display module 3000, and the substrate 4000 disposed under the touch pressure sensing module 2000.

In the touch screens 130 according to the embodiment shown in FIGS. 10 and 13, since the touch pressure sensing module 2000 which includes the spacer layer 2400 or the touch position-pressure sensing module 5000 which includes the spacer layer 5400 is disposed on the display module 3000, the color clarity, visibility, optical transmittance of the display module 3000 may be reduced. Therefore, in order to prevent such problems, the touch position sensing module 1000 and the display module 3000 are fully laminated by using an adhesive like an optically clear adhesive (OCA), and the touch pressure sensing module 2000 is disposed under the display module 3000. As a result, the aforementioned problem can be alleviated and solved. Also, an existing gap formed between the display module 3000 and the substrate 4000 is used as the spacer layer for detecting the touch pressure, so that the overall thickness of the touch screen 130 can be reduced.

The touch position sensing module 1000 according to the embodiment shown in FIG. 15 is the same as the touch position sensing module shown in FIGS. 11*a* to 11*d*.

The touch pressure sensing module 2000 according to the embodiment shown in FIG. 15 may be the touch pressure sensing module shown in FIGS. 12a to 12f and the touch pressure sensing module shown in FIGS. 16a to 16b.

As shown in FIG. 16a, the touch pressure sensing module 2000 according to the embodiment may include the reference potential layer 2500, the spacer layer 2400 formed under the reference potential layer 2500, and the first electrode 2100 formed under the spacer layer 2400. Since the configuration and operation of FIG. 16a are the same as those of FIGS. 12a and 12b with the exception of the fact that the position of the reference potential layer 2500 and the position of the first electrode 2100 are replaced with each other, repetitive descriptions thereof will be omitted hereafter.

As shown in FIG. 16b, the touch pressure sensing module 2000 according to the embodiment may include the reference potential layer 2500, the spacer layer 2400 formed under the ground, the first electrode 2100 formed in a layer under the spacer layer 2400, and the second electrode 2200 formed in a layer under, the layer in which the first electrode 2100 has been formed. Since the configuration and operation of FIG. 16b are the same as those of FIGS. 12c and 12d with the exception of the fact that the position of the reference potential layer 2500, the position of the first electrode 2100 and the position of the second electrode 2200 are replaced with each other, repetitive descriptions thereof will be omitted hereafter. Here, even when the first electrode 2100 and the second electrode 2200 are formed in the same layer, the touch pressure can be detected as described in FIGS. 12c and 12d.

Although it has been described in FIG. 15 that the display module 3000 is disposed under the touch position sensing module 1000, the touch position sensing module 1000 can be included within the display module 3000. Also, although it has been described in FIG. 15 that the touch pressure sensing module 2000 is disposed under the display module 3000, a portion of the touch pressure sensing module 2000 can be included within the display module 3000. Specifically, the reference potential layer 2500 of the touch pressure sensing nodule 2000 may be disposed within the display module 3000, and the electrodes 2100 and 2200 may be formed under the display module 3000. As such, when the reference potential layer 2500 is disposed within the display module 3000, a gap formed within the display module 3000 is used as the spacer layer for detecting the touch pressure, so that the overall thickness of the touch screen 130 can be reduced. Here, the electrodes 2100 and 2200 may be formed on the substrate 4000. As such, when the electrodes 2100 and 2200 are formed on the substrate 4000, not only the gap formed within the display module 3000 but also the gap formed between the display module 3000 and the substrate 4000 is used as the spacer layer for detecting the touch pressure, so that the sensitivity for detecting the touch pressure can be more improved.

FIG. 17a shows a structure of the touch screen according to a fourth embodiment. As shown in FIG. 17a, the touch screen 130 according to the fourth embodiment may include at least one of the touch position sensing module and the touch pressure sensing module within the display module 3000.

FIGS. 17b and 17c are structure views of touch pressure sensing and touch position sensing of the touch screen according to the fourth embodiment. FIGS. 17b and 17c take an LCD panel as an example of the display module 3000.

In case of the LCD panel, the display module 3000 may include a TFT layer 3100 and a color filter layer 3300. The TFT layer 3100 includes a TFT substrate layer 3110 disposed directly thereon. The color filter layer 3300 includes a color filter substrate layer 3200 disposed directly thereunder. The display module 3000 includes a liquid crystal layer 3600 between the TFT layer 3100 and the color filter layer 3300. Here, the TFT substrate layer 3110 includes electrical components necessary to generate an electric field driving the liquid crystal layer 3600. Particularly, the TFT substrate layer 3110 may be comprised of various layers including a data line, a gate line, TFT, a common electrode, a pixel electrode and the like. These electrical components generate a controlled electric field and orient the liquid crystals in the liquid crystal layer 3600. More specifically, The TFT substrate layer include a column common electrode (column Vcom) 3430, a low common electrode (low Vcom) 3410 and a guard shield electrode 3420. The guard shield electrode 3420 is located between the column common electrode 3430 and the low common electrode 3410 and is able to minimize the interference caused by a fringe field which may be generated between the column electrode 3430 and the low comma electrode 3410. The foregoing description of the LCD panel is apparent to those skilled in the art.

As shown FIG. 17b, the display module 3000 according to the embodiment of the present invention may include sub-photo spacers 3500 disposed on the color filter substrate layer 3200. These sub-photo spacers 3500 may be disposed on the interface between the low common electrode 3410 and the adjacent guard shield electrode 3420. Here, a conductive material layer 3510 like ITO may be patterned on the sub-photo spacer 3500. Here, a fringing capacitance C1 is formed between the low common electrode 3410 and the conductive material layer 3510, and a fringing capacitance C2 is formed between the guard electrode 3420 and the conductive material layer 3510.

When the display module 3000 shown in FIG. 17b functions as the touch pressure sensing module, a distance between the sub-photo spacers 3500 and the TFT substrate layer 3110 may be reduced by an external pressure, and thus, a capacitance between the low common electrode 3410 and the guard shield electrode 3420 may be reduced. Accordingly, 17b, the conductive material layer 3510 functions as the reference potential layer and detects the change of the capacitance between the lows common electrode 3410 and the guard shield electrode 3420, so that the touch pressure can be detected.

FIG. 17c shows a structure in which the LCD panel as the display module 3000 is used as the touch position sensing module. The arrangement of the common electrodes 3730 is shown in FIG. 17c. Here, for the purpose of detecting the touch position, these common electrodes 3730 may be divided into a first area 3710 and a second area 3720. Accordingly, for example, the common electrodes 3730 included in dune first area 3710 may be operated in such a manner as to function in response to the first electrode 6400 of FIG. 18c, and the common electrodes 3730 included in one second area 3720 may be operated in such a manner as to function in response to the second electrode 6500 of FIG. 18c. That is, in order that the common electrodes 3730, i.e., electrical components for driving the LCD panel are used to detect the touch position, the common electrodes 3730 may be grouped. Such a grouping can be accomplished by a structural configuration and manipulation of operation.

As described above, in FIG. 17, the electrical components of the display module 3000 are caused to operate in conformity with their original purpose, so that the display module 3000 performs its own function. Also, at least some of the electrical components of the display module 3000 are caused to operate for detecting the touch pressure, so that the display module 3000 functions as the touch pressure sensing module. Also, at least some of the electrical components of the display module 3000 are caused to operate for detecting the touch position, so that the display module 3000 functions as the touch position sensing module. Here, each operation mode may be performed in a time-division manner. In other words, the display module 3000 may function as the display module in a first time interval, as the pressure sensing module in a second time interval, and/or as the position sensing module in a third time interval.

FIGS. 17b and 17c only show the structures for the detection of the touch pressure and the touch position respectively for convenience of description. So long as the display module 3000 can be used to detect the touch pressure and/or the touch position by operating the electrical components for the display operation of the display module 3000, the display module 3000 can be included in the fourth embodiment.

FIG. 1 is a structure view of the touch input device 100 according to an embodiment of the present invention. The device 100 according to the embodiment of the present invention may include a controller 110, the touch screen 130, and a processor 140.

Input to the touch input device 100 may be performed by touching the touch screen 130. The touch input device 100 according to the embodiment of the present invention may be a portable electronic device like a laptop computer, a personal digital assistant (PDA) and a smartphone. Also, the touch input device 100 according to the embodiment of the present invention may be a non-portable electronic device like a desktop computer, a smart television.

The touch screen 130 according to the embodiment of the present invention allows a user to operate a computing system by touching the screen with an object like a finger. In general, the touch screen 130 recognizes the touch on the panel and the computing system analyzes the touch and performs operations in accordance with the analysis.

The processor 140 according to the embodiment of the present invention can detect whether a touch occurs or not on the touch screen and the touch position when the touch occurs on the touch screen 130. Also, the processor 140 can measure the amount of the capacitance change occurring according to the touch when the touch occurs on the touch screen 130.

Specifically, through the touch position sensing module 1000 or the touch position-pressure sensing module 5000 of the touch screen 130, the processor 140 can measure capacitance change amount according to the approach of an object 10 to the touch screen 130 and can calculate the touch position from the measured capacitance change amount. Also, the processor 140 according to the embodiment can calculate the aforementioned touch position through the display module 3000 capable of detecting the touch position/ touch pressure of the touch screen 130.

Also, the capacitance change amount may be changed according to the touch pressure and or touch area when the touch occurs. Therefore, when the touch occurs on the touch screen 130, the processor 140 can measure the capacitance change amount according to the touch pressure and/or the touch area. Here, the less the touch pressure and/or the touch area becomes, the less the capacitance change amount becomes, and the greater the touch pressure and/or the touch area becomes, the greater the capacitance change amount becomes.

Specifically, the processor 140 may measure the capacitance change amount caused by the pressure which is applied from the object 10 to the touch screen 130 through the touch pressure sensing module 2000, the touch position-pressure sensing module 5000 or the display module 3000 of the touch screen 130, which is capable of detecting the touch pressure, and may calculate the magnitude of the touch pressure from the measured capacitance change amount.

The capacitance change amount which is generated by the object 10 touching the touch screen 130 can be measured by summing the capacitance change amounts of each of a plurality of sensing cells. For example, as shown in FIG. 2a, when a common touch is input to the touch screen 130 by the object 10, the sum of the capacitance change amounts is 90. Also, as shown in FIG. 2b, when the touch with pressure is input to the touch screen 130 by the object 10, the sum of the capacitance change amounts is 570 (=90+70+70+70+70+ 50+50+50+50).

Also, the processor 140 may measure the capacitance change amount caused by the approach of the object 10 to the touch screen 130 through the touch position sensing module 1000, the touch position-pressure sensing module 5000 or the display module 3000 of the touch screen 130, which is capable of detecting the touch position/pressure, and may calculate the touch area from the measured capacitance change amount. For example, as shown in FIG. 3a, when the area of the object 10 touching the touch screen 130 is "a", the capacitance change amount is 90 (=50+10+10+ 10+10). As shown in FIG. 3b. When the area of the object 10 touching the touch input device 100 is "b" larger than "a", the capacitance change amount is 310 (=50+45+45+45+45+ 20+20+20+20). Here, the magnitude of the pressure which is applied when the object 10 touches the touch input device 100 in both FIGS. 3a and 3b may be 0 or the same.

In particular, although the processor 140 according to the embodiment of the present invention does not touch directly the touch screen 130, the processor 140 is able to recognize a hovering state in which the object like the finger is close enough to the touch screen 130 to cause the change of the capacitance in the touch screen 130.

For example, when the object is located within about 2 cm from the surface of the touch screen 130, the processor 140 measures the capacitance change amount according to the approach of the object 10 to the touch screen 130 through the touch position sensing module 1000 or the touch position-pressure sensing module 5000 of the touch screen 130, and then is able to calculate, from the measured capacitance change amount, whether or not the object exists and the where the object is located.

In order that the movement of the object is recognized as hovering over the touch screen 130, it is desirable that the error of the capacitance change amount which is generated at the touch screen 130 by the hovering is larger than that of the capacitance change amount which is generated at the common touch screen 130.

The mutual capacitance change amount in the touch screen 130, which is generated during the hovering of the object, may be smaller than that of the capacitance change amount of the direct touch on the touch screen 130. Hereafter, the touch on the touch screen 130 may include the hovering. For example, the hovering may be classified as having the smallest touch pressure and/or the smallest touch area.

Therefore, the processor 140 may detect the capacitance change amount generated at the touch screen 130, may calculate whether the touch occurs or not, the touch position, the touch pressure magnitude and the touch area, and/or may measure the capacitance change amount caused by the touch.

The measured capacitance change amount and/or at least any one of the touch position, touch pressure magnitude and touch area calculated from the measured capacitance change amount is transmitted to the controller 110 by the processor 140. Here, the controller 110 may calculate a touch time period by using the capacitance change amount transmitted from the processor 140. According to the embodiment, the controller 110 may be an application processor. The application processor is able to perform the command interpretation, operation, and control, etc., in the portable electronic device.

Specifically, when the touch on the touch input device 100 corresponds to the hovering, the controller 110 measures a time period during which the capacitance change amount is maintained from a first predetermined value to a second predetermined value, and thus, calculates a time period during which the object touches the touch screen 130. Here, the first predetermined value may be the minimum value of the capacitance change amount which causes the touch to be recognized as the hovering, and the second predetermined value may be the maximum value of the capacitance change amount which causes the touch to be recognized as the hovering. For example, when the first predetermined value is 20 and the second predetermined value is 50, a time period during which the capacitance change amount is maintained from 20 to 50 is, as shown in FIG. 4*a,* 8t, so that the touch time period of the hovering is 8t.

Also, when the touch occurs directly on the touch screen 130, the controller 110 measures a time period during which the capacitance change amount is maintained greater than the second predetermined value, and thus, calculates a time period during which the object touches the touch screen 130. For example, when the second predetermined value is 50, a time period during which the capacitance change amount is maintained greater than 50 is, as shown in FIG. 4*b,* 2t, so that the touch time period of the direct touch is 2t.

The touch input device 100 including the touch screen 130 according to the embodiment of the present invention may further include a memory 120.

The controller 110 determines a touch level on the touch on the touch screen 130 with reference to the memory 120 according to the capacitance change amount transmitted from the processor 140 or the touch time period calculated based on the capacitance change amount, and thus, generates a control signal for feedback according to the touch level.

The memory 120 according to the embodiment of the present invention may include a level table (not shown) and a feedback table (not shown). The level table may store the capacitance change amount and or the touch level on the touch time period. The feedback table may store a feedback means and/or a feedback on the touch level. This will be described in detail with reference to FIGS. 6*a* to 8.

There is a necessity to classify the touch level on the touch screen 130 in accordance with the use of the touch input device 100. That is, when the touches on the touch screen 130 have different touch levels, they may be mutually different input to the touch input device 100. However when the user touches the touch screen 130, he/she has a difficulty in being himself/herself aware of which touch level he/she touches the touch screen 130 at. Therefore, the touch input device 100 according to the embodiment of the present invention is able to provide feedback on the touch level when the user touches the touch screen 130.

In a level determining unit of the controller 110, at least one of the touch pressure magnitude and the touch area may be classified into a stepwise touch level according to the sections of the capacitance change amount. For example, when it is assumed that the capacitance change amount a value from 0 to 600, at least one of the touch pressure magnitude and the touch area may be calculated as a first level for the capacitance change amount in a range with the smallest value from greater 0 to 150, at least one of the touch pressure magnitude and the touch area may be calculated as a second level for the capacitance change amount in a range with next largest value from greater 150 to 300, at least one of the touch pressure magnitude and the touch area may be calculated as a third level for the capacitance change amount in a range with the next largest value from greater 300 to 450, and at least one of the touch pressure magnitude and the touch area may be calculated as a tour level for the capacitance change amount in a range with the largest value from greater 450 to 600. According to the embodiment, the first level may represent the touch pressure magnitude or the touch area according to the hovering. Here, the stepwise classification of the touch pressure magnitude or the touch area may be changed according to the embodiment. For example, the touch pressure magnitude or the touch area may be classified into only the hovering and the direct touch, or may be classified into various levels including the hovering. Such a correlation between the capacitance change amount and the touch level may be stored in the level table.

This is just an example. The touch pressure magnitude and/or the touch area may be set to have a continuous value in such a manner proportional to the capacitance change amount.

Therefore, since the capacitance change amount is 90 when the touch occurs as shown in FIGS. 2*a* and 3*a,* the touch pressure magnitude and/or the touch area may be calculated as the first level. Since the capacitance change amount is 570 when the touch occurs as shown in FIG. 2*b,* the touch pressure magnitude and/or the touch area may be calculated as the fourth level. Since the capacitance change amount is 310 when the touch occurs as shown in FIG. 3*b,* the touch pressure magnitude and/or the touch area may be calculated as the third level.

However, this is just an example. The feedback can be determined from the capacitance change amount without calculating the touch level. In this case, when the capacitance change amount is assumed to have a value from 0 to 600, the feedback table of the memory 120 may be created such that the feedback in the range from greater 0 to 150, the feedback in the range from greater 150 to 300, the feedback in the range from greater 300 to 450, and the feedback in the range from greater 450 to 600 are distinguished from each other.

Also, in the level determining unit, the touch time period may be classified into a stepwise touch level. Specifically, when it is assumed that the touch time period has a value from 0t to 12t, the touch time period in a range with a value from greater 0t to 3t may be calculated as a first level, the touch time period in a range with the next largest value from greater 3t to 6t may be calculated a second level, the touch time period in a range with the next largest value from greater 6t to 9t may be calculated as a third level, and the touch time period in a range with the largest value from greater 9t to 12t may be calculated as a fourth level. Therefore, the touch time period (8t) shown in FIG. 4*a* may be calculated as the third level, and the touch time period (4t) shown in FIG. 4*b* may be calculated as the second level.

Such a correlation between the touch time period and the touch level may be stored in the level table of the memory 120.

However, this is just an example. The feedback can be determined from the touch time period without calculating the touch level. In this case, when the touch time period is assumed to have a value from 0 t to 3t, the feedback table of the memory 120 may be created such that the feedback in the range from greater 0t to 3t, the feedback in the range from greater 3t to 6t, the feedback in the range from greater 6t to 9t, and the feedback in the range from greater 9t to 12t are distinguished from each other.

The foregoing process of determining the touch level may be performed by a pressure magnitude determining unit of the controller 110 or by the processor 140.

FIG. 5 shows feedback performing steps based on the touch level on the screen 130 of touch input device 100 according to the embodiment of the present invention. As shown in FIG. 5, the feedback performing method based on the touch level on the touch screen 130 of the touch input device 100 according to the embodiment of the present invention may include a step S210 of performing the touch on a touch input window 200 displayed on the touch screen 130.

The touch input window 200 is displayed on the touch screen 130 of the touch input device 100 and may be generally a screen displaying a region which is touched by the user and is indicated by reference numeral 400 in FIG. 6. Hereafter, a case where the touch region is clearly displayed will be described. However, this is just an example and the touch position is not necessarily clearly displayed. For example, any position of the touch input window 200 displayed on the touch screen 130 may be touched, or a predetermined position of the touch input window 200 may be touched. FIG. 6 and the following description show that the touch input window 200 is displayed on the entire touch screen 130. However, the touch input window 200 may represent a portion of the touch screen 130, for example, only the touch region indicated by reference numeral 400.

As shown in FIG. 5, the feedback performing, method based on the touch level according to the embodiment of the present invention may include a step S220 of determining the touch level on the touch input window 200 displayed on the touch screen 130. The step S220 of determining the touch level may be performed by the controller 110. For example, the controller 110 may include the level determining unit which determines a level corresponding to the capacitance change amount according to the touch processed by the processor 140. Here, the controller 110 may make reference to a table, i.e., the level table, for a correlation between the level and the touch pressure magnitude, touch area and/or touch time period.

When the touch occurs on the touch screen 130, the level table may store the correlation between the touch level and the capacitance change amount which is generated at the touch screen 130 in accordance with the touch pressure magnitude and/or the touch area, or the correlation between the touch level and the touch time period calculated by the capacitance change amount. According to the touch pressure magnitude, touch area and/or touch time period, the touch level may be classified into a plurality of levels. For example, the touch level may have at least two levels.

Also, the controller 110 may directly determine the plurality of touch levels simply from the data for the capacitance change amount, which has been received from the processor 140, without reference to the memory 120.

As shown in FIG. 5, the feedback performing method based on the touch level according to the embodiment of the present invention may include a step S230 of generating the control signal for the feedback according to the touch level.

The step S230 of generating the control signal may be, performed by making reference to the memory 120 which stores a unique feedback method for each of the plurality of touch levels. A feedback means according to the touch level may be also stored together in the feedback table of the memory 120. For example, information on which feedback means among vibration, sound and screen display the feedback according to the touch level is performed may be stored in a feedback table. For instance, the memory 120 may include the feedback table storing the feedback means and/or feedback method which corresponds to each of the plurality of touch levels.

For example, the control signal generated by a control signal generator of the controller 110 may be transmitted to at least one of a display drive unit (not shown), a speaker drive unit (not shown), a vibration device drive unit (not Shown) of the means performing the corresponding feedback.

As shown in FIG. 5, the feedback performing method based on the touch level according to the embodiment of the present invention may include a step S240 of performing the feedback in accordance with the control signal generated in step S230. The feedback may be performed by the feedback method on the corresponding touch level in the feedback means determined according to the touch level on the touch screen 130.

The step S240 of performing the feedback by the feedback method according to the embodiment of the present invention may be carried out during the touch of the object on the touch screen. For example, the user checks the corresponding touch level through the feedback while touching the touch screen 130 by using the object.

FIGS. 6a to 8 show the feedback means and feedback method according to the touch level in accordance with the embodiment of the present invention. FIGS. 6a to 6e show a feedback means and feedback method according to the touch level in accordance with the first embodiment of the present invention.

FIG. 6a shows that the feedback on the touch level is displayed on the touch screen 130 when a finger 500 touches a touch region 400. The feedback may be displayed on the touch screen 130 in the form of any shape or by any method such that the plurality of touch levels are distinguished from each other.

FIG. 6a shows that the touch level on the touch region 400 is displayed on the touch screen 130 in the form of a digital bar 600. For example, when the user touches the touch region 400, the user is able to be aware of the touch level by checking the digital bar 600 displayed on the touch screen 130.

FIG. 6a shows that the finger 500 presses the touch region 400 at the third level. As shown, in FIG. 6a, the digital bar 600 is able to display four different states from the first level to the fourth level. For example, the digital bar 600 may display a first bar 601 with shading when the touch region 400 is touched at the first level, may display the first bar 601 and a second bar 602 with shading when the touch region 400 is touched at the second level, may display the first bar 601 to a third bar 603 with shading when the touch region 400 is touched at the third level, and may display the first bar 601 to a fourth bar 604 with shading when the touch region 400 is touched at the fourth level. In the digital bar 600 in FIG. 6a, the first bar 601 to the third bar 603 are displayed with shading and the fourth bar 604 is not displayed with shading, it can be seen that the finger 500 touches the touch region 400 at the third level.

The digital bar 600 may be displayed on the screen, for example, when the touch occurs on the touch region 400. Through the digital bar 600, the user is allowed to check visually the change of the level of the touch on the touch region 400. The user is allowed to change the touch level until he/she finally selects the touch level that he/she wants.

When the touch level according to the touch pressure magnitude or the touch area is intended to be changed, the touch level that the user wants can be selected by controlling the touch pressure magnitude or the area of the finger 500 touching the touch region 400.

In the change of the touch level according to the touch time period, when the touch level does not reach the desired touch level, the desired touch level can be selected by maintaining the touch until the touch time period reaches the touch time period that the user wants. However, when the touch level exceeds the desired touch level, the desired touch level cannot be selected by decreasing the touch level. In this case, by maintaining the touch during a time period longer than a predetermined maximum touch time period, the touch level is reset and the low touch level is selected. As a result, the desired touch level can be selected.

Specifically, in the digital bar 600, when the touch time period of the touch region 400 exceeds the fourth level, the touch level starts again from the first level. Here, the first bar 601 indicating the first level may be displayed with shading. Then, as the touch time period is increased, the touch level may be displayed in the order of the second level, the third level and the fourth level.

Also, unlike the foregoing, in the digital bar 600, when the touch time period of the touch region 400 exceeds the fourth level, the touch level is decreased to the third level. Here, the first to the third bars 601, 602 and 603 indicating the third level may be displayed with shading. Then, as the touch time period is increased, the level may be displayed such that the level is decreased to the second level and the first level in reverse order and then is increased in the order of the second level and the third level when the level reaches the first level.

After that, the user checks the touch level through the digital bar 600, and then selects the desired touch level. For example, after the user touches the touch region 400 at desired touch level, the user may release the finger 500 from the touch input window 200. Here, in the case where the touch is selected according to the touch pressure magnitude and/or the touch area, when the finger 500 of the user stays at a position for the finger 500 to be recognized as the hovering over the touch screen 130, the controller 110 may recognize that the touch level is still being checked. Therefore, the user presses the touch region 400 of the touch screen 130 at the desired touch level, and then moves the finger 500 out of the position for the finger 500 to be recognized as the hovering over the touch screen 130.

For example, when the desired touch level is the third level, through the digital bar 600 shown FIG. 6a, the user checks that the touch level at which the touch region 400 is pressed is the third level. Then, the third level can be selected by releasing the finger 500 from the touch put window 200.

Here, when the touch level is selected according to the touch pressure magnitude and/or the touch area, during the release of the finger 500, the touch pressure magnitude or the touch area on the touch region 400 passes through from the third level to the second level and the first level, and then reaches a state where there is no touch pressure magnitude or touch area. Here, when the staying time period at each touch level is less than a predetermined time period, the controller 110 is set such that the corresponding touch level is not selected, so that it is possible to prevent an error of selecting an incorrect touch level at the time of releasing the finger. As a result, it is possible that the incorrect selection is made due to the rapid change of the touch pressure magnitude or the touch area, for example, the release of the finger. For example, when the third level is selected and the finger 500 is released, the selection of the first level can be prevented.

The feedback table included in the memory 120 may store the feedback means and/or the feedback method based on the touch level, on the touch region 400 respectively. The controller 110 may make reference to the level table in accordance with the level of the touch on the touch region 400, and thus, may generate the control signal such that an output indicating the corresponding touch level is accomplished.

In FIG. 6a, the digital bar 600 which is displayed as the feedback means on the touch screen 130 may be set in advance in the feedback table. The first bar 601 to the third bar 603 of the digital bar 600 may be stored as the feedback method such that the first bar 601 to the third bar 603 are displayed with shading to indicate the third level. In FIG. 6a, the control signal generated from the control signal generator of the controller 110 may be indirectly or indirectly transmitted to the display drive unit (not shown) capable of driving the display panel, i.e., the corresponding feedback means, of the touch screen 130.

The control signal indicating the feedback means and the feedback method may display the digital bar 600 on the display panel through the display drive unit (not shown) in accordance with the control signal, and may display the first to the fourth hats 601 to 604 with shading.

The method of checking the touch level en the touch screen 130 through the display panel of the touch screen 130 is not limited to the aforementioned digital bar 600. Any various methods may be used as the method of checking the touch level. After a unified means like the digital bar 600 shown in FIG. 6a is displayed, the shading, etc., are differentially applied according to the touch level, so that the touch levels are can be distinguished. Furthermore, mutually different shapes, icons, etc., having no correlation at all with the touch level may be displayed on the touch screen 130.

More specifically, it can be understood that the feedback according to the touch level is correlated with the touch level in the feedback method shown in FIG. 6a. That is, the feedback method shown in FIG. 6a has a positive correlation in which the more the touch level rises, the larger the number and/or order of the bars of the digital bar 600 which are displayed with shading is. It is possible to configure that the feedback and the touch level have a negative correlation in which the more the touch level rises, the less the number and/or order of the bars of the digital bar 600 which are displayed with shading is.

As such, when the feedback on each of the plurality of touch levels is performed to have the correlation with the touch level, at the moment when the user recognizes the feedback, the user is able to be intuitively aware of which touch level the touch screen 130 is touched at. However, in the trend of considering privacy including personal information as important, when there is necessity of protecting information according to the input of the user, problems may be caused.

Therefore, the present invention is able to provide the feedback according to the touch level when the user touches the touch screen 130 and to provide a feedback technology of causing a third party not to easily recognize the feedback. In other words, the present invention is able to provide the feedback such that the feedback on each of the plurality of touch levels is uncorrelated with the touch level. That is, the feedback on the touch level may be selected and performed in such a manner that the corresponding touch level cannot be intuitively recognized.

FIGS. 6b to 6e show that the feedback on each of the plurality of touch levels has the uncorrelation with the touch level.

As shown in FIG. 6b, when the user touches the touch region 400 at the first level, the feedback may be provided such that a circle 601 is displayed. The user is able to recognize in advance that the circle 601 is a feedback indicating the first level or to set the feedback indicating the first level as the circle.

As shown in FIG. 6c, when the user touches the touch region 400 at the second level, the feedback may be provided such that a triangle 602 is displayed. Likewise, as shown in FIGS. 6d and 6e, when the user touches the touch region 400 at the third level and the fourth level, the feedback may be provided such that a quadrangle 603 and a lozenge 604 are displayed.

Here, even though a third party sees that the circle 601, the triangle 602, the quadrangle 603 and the lozenge 604 are displayed on the touch screen 130, the third party is not able to recognize which touch level the corresponding shape has. Therefore, the touch information of the user according to the touch level is protected from the third party, so that security can be improved. Here, the user may be fully aware in advance of the touch levels that the shapes, icon, etc., indicate. The user is able to check his own touch level in accordance with the change of the shape.

The foregoing has described the case where the feedback has the uncorrelation with the touch level without changing the feedback means. However, this is just an example. The feedback including the change of the feedback means may be uncorrelated with the touch level. For example, a first shape may be displayed on the touch screen for the first level, and vibration having a first rhythm may be generated for the second level.

The feedback method which is described with reference to FIGS. 7 and 8 is similar to the feedback method which is described with reference to FIG. 6. Therefore, the following description will be focused on the difference between them.

In FIG. 7a, when the finger 500 touches the touch region 400, the touch level may be output in the form of sound 310 through a speaker 300. Here, the output through the speaker may be set in advance as the feedback means of the feedback table. Also, the sound which is distinguished and output according to the touch level may be stored as the feedback method of the feedback table.

Here, the control signal which is output from the control signal generator of the controller 110 is transmitted to a speaker drive unit (not shown) and may allow the speaker 300 to be driven according to the corresponding feedback method. At least one of the frequency, amplitude, length, kind, melody and the number of the sound 310 which is output through the speaker 300 may be changed so as to distinguish each of the plurality of touch levels.

Here, the feedback may be performed such that the feedback on each of the plurality of touch levels has the correlation with the touch level. However, according to the embodiment of the present invention, the feedback may be performed such that the feedback on each of the plurality of touch levels is uncorrelated with the touch level. For example, the case where the feedback on each of the plurality of touch levels has the correlation with the touch level means that the feedback may be performed such that the sound is generated one time for the first level, the sound is generated twice for the second level, the sound is generated three times for the third level, and the sound is generated four times for the fourth level.

FIG. 7b shows that the feedback on each of the plurality of touch levels has the uncorrelation with the touch level. FIG. 7b shows that different rhythms have been assigned to the first to the fourth levels. The sound with a rhythm of long-long-long-short-short for the first level, the sound with a rhythm of long-short-long-short-long for the second level, the sound with a rhythm of short-long-short-long-short for the third level, and the sound with a rhythm of short-short-short-long-long for the fourth level may be output as the feedback. Here, the "long" may represent a sound output time period relatively longer than that of "short". In the specification of the present invention, the rhythm of the sound may have a concept included in the melody.

Also, in the case where the feedback is led such that the feedback on each of the plurality of touch levels has the correlation with the touch level, sounds made by a cat for the first level, sounds made by a goat for the second level, sounds made by a puppy for the third level, sounds made by a calf for the fourth level may be also separately output. Furthermore, the sound may be variously set such that the feedback on each of the plurality of touch levels is uncorrelated with the touch level. The feedback method according to the touch level may be stored in the feedback table.

In FIG. 8, when the finger 500 touches the touch region 400, the touch level may be output in the form of vibration 710 through a vibration device (not shown). The output through the vibration device (not shown) may be set in advance as the feedback means of the feedback table. Also, the vibration 710 which is distinguished and output according to the touch level may be stored as the feedback method of the feedback table.

Here, the control signal which is output from the control signal generator of the controller 110 is transmitted to the vibration device drive unit (not shown) and may allow the vibration device (not shown) to be driven according to the corresponding feedback method. At least one of the frequency, intensity, length, melody and the number of the vibration 710 which is output through the vibration device (not shown) may be changed so as to distinguish each of the plurality of touch levels.

Here, the feedback may be performed such that the feedback on each of the plurality of touch levels has the correlation with the touch level. However, according to the embodiment of the present invention, the feedback may be performed such that the feedback on each of the plurality of touch levels has the uncorrelation with the touch level.

For example, in the case where the feedback on each of the plurality of touch levels has the correlation with the touch level, the feedback may be performed such that the vibration is generated one time for the first level, the vibration is generated twice for the second level, the vibration is generated three times for the third level, and the vibration is generated four times for the fourth level. Also, in the feedback on each of the plurality of touch levels has the uncorrelation with the touch level, for example, the feedback may be set such that the vibration is generated according to the rhythms shown in FIG. 7b.

The feedback method according to the touch level may be stored in the feedback table. Here, the intensity of the vibration 710 may represent power which drives the vibration device.

Hereafter, a passcode and an unlocking function which are capable of improving the security of the touch input device 100 and of protecting the user's privacy by using the aforementioned feedback method and feedback means according to the touch level will be described with reference to FIGS. 9a to 9d.

With reference to the memory 120 in accordance with the processing result from the processor 140, the controller may signal as to whether the pressure magnitude, area, the number, rhythm and/or position of the touch on the touch screen 130 match a predetermined passcode or not.

The memory 120 according to the embodiment of the present invention may store, for example, a predetermined passcode. The predetermined passcode may be set advance by the user or may be set by default for the touch input device 100. There may be a requirement or process of unlocking for the purpose of using the touch input device 100 according to the embodiment of the present invention or for the purpose of performing a specific application or function. Here, it is necessary to input a specific passcode so as to unlock. Such a passcode may be stored as the predetermined passcode in the memory 120.

The controller 110 according to the embodiment of the present invention may further include a comparator (not shown). The comparator compares a passcode which is input through the touch screen 130 with the predetermined passcode of the memory 120, thereby determining whether the two passcodes match each other or not. The controller 110 is hereby able to generate the first control signal. Although it is described that comparator is included controller 110, this is an example. The comparator may be located in any place and be included in the processor 140 in accordance with the embodiment.

The passcode input window 200 according to the embodiment of the present invention allows the user to input the passcode for unlocking the screen in order to use the touch input device 100 or in order to perform a specific application of function. In the past, in general, the screen is unlocked by inputting a passcode consisting of a predetermined combination of letters and/or numbers to the passcode input window 200. The present invention is able to provide a passcode and an unlocking function which are capable of maintaining high security and are easy to operate.

FIG. 9a shows an example of a process of unlocking the passcode input window 200 according to the first embodiment of the present invention. In FIG. 9a, the passcode input window 200 according to the first embodiment is displayed on the touch screen 130 of the touch input device 100. As shown in FIG. 9a, the passcode input window 200 according, to the first embodiment may include a plurality of passcode input region 400. For the purpose of unlocking the touch input device 100, the user is able to perform the touch with the same touch pressure magnitude and/or touch area as the touch pressure magnitude and/or touch area which is stored as the predetermined passcode for each of the passcode input regions 401, 402, 403 and 404.

The comparator included in the controller 110 is able to determine whether or not all the touch levels on the passcode input regions 401, 402, 403 and 404 match, respectively, the touch levels of the corresponding regions, which have been stored as the predetermined passcode. When the comparator determines that all the touch levels on the passcode input regions 401, 402, 403 and 404 match, respectively, the touch levels of the corresponding regions, the controller 110 may generate the first control signal for unlocking the touch input device 100. When even at least one of the touch levels on the passcode input regions 401, 402, 403 and 404 is different from the touch level of the corresponding region, which has been stored as the predetermined passcode, the controller 110 may notify that the input passcode is wrong, may provide a chance to input a passcode again and/or may generate the first control signal causing the touch input device 100 not to be unlocked.

For example, as the predetermined passcode, the third level may be set in the first region 401, the fourth level may be set in the second region 402, the first level may be set in the third region 403, and the second level may be set in the fourth region 404. That is, according to the embodiment of the present invention, the touch level as well as the position of the passcode input region may be used as the passcode. Here, the touch level may be on at least one of the touch pressure magnitude, touch area and touch time period.

In order to unlock the touch input device 100, the user may touch the first region 401 with a predetermined position at the third level, may touch the second region 402 at the fourth level, may touch the third region 403 at the first level, and may touch the fourth region 404 at the second level.

Here, according to the embodiment, it is not necessary to sequentially perform the touch from the first region 401 to the fourth region 404. Here, the passcode for unlocking may be set through a combination of the touch position and the touch level. In this case, when the combination of the touch position and the touch level matches that of the passcode regardless of the touch order, the touch input device 100 can be unlocked. When the passcode for unlocking may be set through a combination of the touch order as well as the touch position and touch level, the touch input device 100 can be unlocked by touching the first to the fourth regions 401, 402, 403 and 404 in accordance with the touch order determined as the predetermined passcode.

The memory 120 of the touch input device 100 stores the position of each of the passcode input regions 400. Therefore, the touch occurs on any region 401 among the passcode input regions 400, the comparator of the controller compares the position information stored in the memory 120 with the information on the touch position as the processing result of the processor 140 thereby recognizing which region the touch has occurred on.

Here, when the user touches the touch screen 130 of the touch input device 100, he/she has a difficulty, in being himself/herself aware of which touch level he/she touches the touch screen 130 at. Therefore, in the input of the passcode for unlocking, an error inevitably occurs. Thus, the touch input device 100 according to the embodiment of the present invention is able to provide feedback on the touch level when the user touches the touch screen 130. The feedback method and means described with reference to FIGS. 6a to 8 can be used. For example, when the user touches each of the passcode input regions 401, 402, 403 and 404, the user checks the touch level and finally selects a touch level that the user wants. Accordingly, the touch on each region 401, 402, 403 and 404 can be completed.

Also, the passcode input window 200 according to the embodiment of the present invention may include a text input window (not shown). For example, the text input window may disposed between the first to the fourth regions 401 402, 403 and 404 or at any position. Also, the shape of the text input window may be the same as or different from those of the first to the fourth regions 401, 402, 403 and 404. Also, the text input window may include a space in which a text including at least one letter, number, symbol, etc., can be input. In order to input the text to the text input window, the user is allowed to use a key pad (not shown) which can be displayed on the touch screen.

In this case, when all the touch levels on the plurality if passcode input regions 401, 402, 403 and 404 match, respectively, the touch levels of the corresponding regions, which have been stored as the predetermined passcode and when the text input to the text input window matches a text stored as the predetermined passcode, the controller 110 generates the first control signal and unlocks the touch input device 100.

The passcode input window 200 according to the embodiment of the present invention may include one passcode input region 401. The passcode input region 401 invention not necessarily explicitly displayed, and the passcode input window 200 itself may be recognized as the passcode input region.

For the purpose of unlocking touch input device 100, the user may touch the passcode input region 401 by means of the number, rhythm and/or level of the touch, which have been stored as the predetermined passcode.

According to the embodiment, the number of the touches and the rhythm of the touch on the passcode input region 401 nay be set as the predetermined passcode. For instance the touch occurs distinctively five times on the passcode input region 401 during a predetermined time period, and the five touches may consist of "long-short-long-long-short". Here, a time interval the object to be separated from the touch screen 130 may be required between the touches. The actual touch period may be stored together as the predetermined passcode, for example, "long" means a touch for 2 seconds, and "short" means touch for 1 second. However, an additional checking process may be required for the user to clearly distinguish the touch time period. Therefore, the passcode may be generated such that "long" and "short" are distinguished by comparing relative time periods of continuous touches according to the embodiment. For example, on the basis of the touch duration time of the first touch in the five continuous touches, the touches with touch duration times within a predetermined error range of the touch duration time of the first touch are distinguished from touch duration times of the rest of the touches, and then it is determined whether the touch duration times of the rest of the touches are greater or less than that of the first touch. Accordingly, when the touch duration times of the rest of the touches are greater than that of the first touch, the rest of the touches are recognized as "long" and the first touch and the touches with touch duration times within the predetermined error range are recognized as "short". Likewise, when the touch duration times of the rest of the touches are less than that of the first touch, the rest of the touches are recognized as "short" and the first touch and the touches with touch duration times within the predetermined error range are recognized as "long". The distinction between "long" and "short" is just an example. The relative length of time can be compared in various ways.

Also, the rhythm of "long-short-long-long-short" may be a relative length between time intervals having no touch between the touches. For example, the rhythm may be set such that the touch occurs actually six times and the relative length of five time intervals where the finger has not touched the touch screen between the six touches has a rhythm of "long-short-long-long-short". A rhythm on the relative length between the touch time interval on the touch screen and the time interval between the touches may be set as a passcode.

The comparator included in the controller 110 is able to determine whether or not the number and rhythm of the touch on the passcode input region 401 match the number and rhythm of the touch, which have been stored as the predetermined passcode. When the comparator determines that the number and rhythm of the touch on the passcode input region 401 match the number and rhythm of the touch, the controller 110 may generate the first control signal for unlocking the touch input device 100. The touch rhythm can be sequentially applied to the plurality of passcode input regions 401, 402, 403 and 404 shown in FIG. 9*a*.

Also, according to the embodiment, the number of the touches and the level of the touch on the passcode input region 401 may be set as the predetermined passcode. For instance, the touch occurs distinctively five times on the passcode input region 401 during a predetermined time period, and the five touches may consist of "great-small-great-great-small". Here, "great" may represent that the touch occurs at a level which is relatively greater than "small". The actual touch level may be stored together as the predetermined passcode, for example, the first level is assigned to "great" and the second level is assigned to "small". However, an additional checking process may be required for the user to clearly distinguish the touch level. Therefore, the passcode may be generated such that "great" and "small" are distinguished by comparing relative levels of continuous touches according to the embodiment. For example, on the basis of the touch level of the first touch in the five continuous touches, the touches with touch levels within a predetermined error range of the touch level of the first touch are distinguished from touch levels of the rest of the touches, and then it is determined whether the touch levels of the rest of the touches are greater or smaller than that of the first touch. Accordingly, when the touch levels of the rest of the touches are greater than that of the first touch, the rest of the touches are recognized as "great" and the first touch and the touches with touch levels within the predetermined error range are recognized as "small". Likewise, when the touch levels of the rest of the touches are smaller than that of the first touch, the rest of the touches are recognized as "small" and the first touch and the touches with touch levels within the predetermined error range are recognized as "great". The distinction between "great" and "small" is just an example. The relative touch level can be compared in various ways.

Furthermore, the foregoing combination of the rhythm according to the touch time period and/or the rhythm according to the touch level may be used to unlock.

The comparator included in the controller 110 is able to determine whether or not the number and level of the touch on the passcode input region 401 match the number and level of the touch, which have been stored as the predetermined passcode. When the comparator determines that the number and level of the touch on the passcode input region 401 match the number and level of the touch, the controller 110 may generate the first control signal for unlocking the touch input device 100.

The foregoing combination of the number of the touches, touch level and touch rhythm can be used to unlock the touch input device 100 and can be also applied to the following embodiments.

FIG. 9*b* shows an example of a process of unlocking the passcode input window 200 according to the second embodiment of the present invention. In FIG. 9*b*, the passcode input window 200 according to the second embodiment is displayed on the touch screen 130 of the touch input device 100. As shown in FIG. 9b, the plurality of touches may be simultaneously input to the passcode input window 200.

In the second embodiment, the comparator included in the controller 110 is able to determine whether or not the combination of the levels and the number of the touches occurring simultaneously on the passcode input window 200 matches the combination of the levels and the number of the touches which have been stored as the predetermined passcode. When the comparator determines that the combination of the levels and the number of the touches occurring simultaneously on the passcode input window 200 matches the combination of the levels and the number of the touches which have been stored as the predetermined passcode, the controller 110 may generate the first control signal for unlocking the touch input device 100. When even at least one of the combinations of the levels and the number of the touches occurring simultaneously on the passcode input window 200 is different from the combination of the levels and the number of the touches, which has been stored as the predetermined passcode, the controller 110 may notify that the input passcode is wrong, may provide a chance to input a passcode again and/or may generate the first control signal causing the touch input device 100 not to be unlocked.

In the second embodiment, since the plurality of touches occur simultaneously on the passcode input window 200, it may be difficult to check the touch level according to the feedback. Therefore, in the second embodiment, only the direct touch and hovering on the touch screen 130 can be simply distinguished. In this case, only the first level and the second level may be distinguished. Otherwise, only the touch level of "great" and the touch level of "small" may be relatively distinguished.

For example, it may be set that, as the predetermined passcode, four touches should simultaneously occur on the passcode input window 200 and two out of the four touches should be direct touches and the rest of the two should be hovering, otherwise, two out of the four touches should be relatively the touch levels of "great" and the rest of the two should be the touch levels of "small". In other words, in the second embodiment, the number and the level of the simultaneously occurring touches can be used as the passcode.

So as to unlock the touch input device 100, the user touches simultaneously the passcode input window 200 with a first finger 510 to a fourth finger 540. Here, the user touches directly with the first finger 510 and the second finger 520 (e.g., the second level) and may perform the hovering with the third finger 530 and the fourth finger 540 the first level). Here, a fifth finger 550 does not touch the passcode input window 200.

As shown in FIG. 9b, according to the embodiment, the passcode input window 200 may include a plurality of divided regions. For example, each divided region is displayed with a grid cell (displayed with 1×1 to N×M) consisting of N columns and M rows. Here, the number and the level of the simultaneously occurring touches may be used as the passcode.

According to the embodiment, the predetermined passcode may be set through a combination including not only the foregoing number and the level of the simultaneously occurring touches but also the touch position. For example, a condition that two touches should occur in the 3×1 and 4×1 grid cell positions at the second level and two touches should occur in the 2×2 and 3×3 grid cell positions at the first level may be further stored as the predetermined passcode. In this case, in order to unlock the touch input device 100, the user may perform the touch on the passcode input window 200 by means of the same touch position as well as the same number and same level of the simultaneously occurring touches as the touch position, number and level of the predetermined passcode.

FIG. 9c shows an example of a process of unlocking the passcode input window 200 according to the third embodiment of the present invention. In FIG. 9c, the passcode input window 200 according to the third embodiment is displayed on the touch screen 130 of the touch input device 100. As shown in FIG. 9c, the passcode input window 200 according to the third embodiment may include a plurality of nodes 401 to 415.

In the third embodiment, the comparator included in the controller 110 is able to determine whether or not a combination of the touch level and the nodes that are touched among the plurality of nodes 401 to 415 displayed on the passcode input window 200 matches a combination of the touch level and the nodes that are touched, which has been stored as the predetermined passcode. When the comparator determines that the combinations match each other, the controller 110 may generate the first control signal for unlocking the touch input device 100.

For example, it may be set that, as the predetermined passcode, the touch should occur the nodes 401, 404, 405, 406, 408, 411, and 415 and the touch should occur the nodes 405 and 411 at the first level, the touch should occur the nodes 406 and 415 at the second level, the touch should occur the node 404 at the third level, and the touch should occur the nodes 401 and 408 at the fourth level. In other words, in the third embodiment, the node that is touched and the touch level can be used as the passcode.

Here, according, to the embodiment, it is not necessary to sequentially perform the touch on the nodes 401 to 415 according to the reference numeral of the node. Here, the passcode for unlocking may be set through a combination of the touch level and the node that is touched. In this case, when the combination of the touch level and the node that is touched matches that of the passcode regardless of the touch order, the touch input device 100 can be unlocked.

When the passcode for unlocking may be set through a combination of the touch order as well as the touch level and the node that is touched, the touch input device 100 can be unlocked by touching the nodes 401, 404, 405, 406, 408, 411, and 415 in accordance with the touch order determined as the predetermined passcode. For example, it is shown in FIG. 9c, that the order of the touch on the node is the node 401, node 408, node 406, node 405, node 404, node 411, and node 415. However, this is just an example. The order of the touch node may be randomly determined.

Also, a line connecting the nodes that are touched according to the embodiment may or may not be touched by the finger, etc. For example, in FIG. 9c, when the finger touches the node 401 with a predetermined area and moves to the node 408, it may be, as indicated by line 1, set such that the finger moves touching the passcode input window 200 or moves without touching. When the finger moves touching between the nodes, the touch area is not distinguished and only the direct touch may be recognized. According to the embodiment, only the direct touch and hovering may be distinguished.

FIG. 9d shows an example of a process of unlocking the passcode input window according to the fourth embodiment of the present invention. In FIG. 9d, the passcode input window 200 according to the fourth embodiment is displayed on the touch screen 130 of the touch input device 100. Similar to the third embodiment shown in FIG. 9c, in the embodiment shown in FIG. 9d, the passcode input window 200 may include a plurality of nodes 401 to 405. The fourth embodiment is similar to the aforementioned third embodiment. However, unlike the third embodiment, the positions and shapes of the nodes 401 to 405 are not clearly displayed on the passcode input window 200. In the fourth embodiment, the plurality nodes 401 to 405 are concealed in the passcode input window 200. For example, as shown in FIG. 9d, the plurality of nodes 401 to 405 are hidden behind a specific shape (rabbit shape), so that each node can be created unnoticeably.

According to the embodiment, the user may set in advance the plurality of nodes 401 to 405 in the shape displayed on the passcode input window 200. Otherwise, according to the embodiment, a shape in which the plurality of nodes 401 to 405 have been defined in advance may be displayed on the passcode input window 200. Here, the method of unlocking is the same as the method described relative to the third embodiment. That is, the combination of node that is touched among the plurality of nodes 401 to 405, the touch level and/or the touch order may be used as the passcode. Here, also, in the third and fourth embodiments, the combination of the number, rhythm and/or level of the touch on each node 401 may be also set as the passcode. Also, between the touches on the plurality of nodes, the rhythm of the touch may be set as the passcode.

A process of unlocking the passcode input window according to a fifth embodiment of the present invention may be performed by performing according to a specific pattern the touch on the passcode input window 200 displayed on the touch screen 130 (not shown). According to the embodiment, the user may set a passcode in advance by drawing a pattern to be used as a passcode on the touch screen 130. For example, a heart-shaped pattern may be set as a passcode, and then the user may touch on the touch screen 130 in accordance with the preset heart-shaped pattern so as to unlock. Here, a start point in the drawing of the passcode pattern and/or the order of the drawing may be also set as a passcode.

Here, the specific pattern to be stored as the passcode may be any shape or picture. Also, the specific pattern to be stored as the passcode may be a text including letters, numbers and any symbols. Here, the text may be recognized as a text or shape.

The comparator compares the input pattern with the specific pattern stored as the predetermined passcode. Here, when similarity between the patterns is greater than a predetermined value, the touch input device 100 may be unlocked. Here, a position where the specific pattern is drawn may be set as a passcode. Even when a touch according to the corresponding pattern occurs on any position of the passcode input window 200 in accordance with the embodiment, the touch may be recognized as the same pattern. According to the embodiment, the passcode pattern which is input according to the touch on the passcode input window 200 may or may not be displayed on the touch screen 130.

Also, according to the embodiment, a touch for drawing the specific pattern on the touch screen 130 may include the hovering as well as the direct touch. Also, the touch for drawing the specific pattern may be performed by a combination of the direct touch and the hovering. For example, the direct touch may be performed in a predetermined interval of the specific pattern and the hovering may be performed in the other interval of the specific pattern. Here, the touch level may be also combined as the passcode.

Although preferred embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch input device capable of unlocking a passcode in accordance with a touch pressure, the touch input device comprising:
   a touch screen which displays a passcode input window;
   a controller which generates a first control signal as to whether or not a touch on the passcode input window matches a predetermined passcode; and
   a memory which stores the predetermined passcode;
   wherein the passcode input window comprises a plurality of nodes which are disposed in different positions on a background image displayed on the touch screen;
   wherein a number of touched nodes among the plurality of nodes and a pressure level of the touch on each of the touched nodes among the plurality of nodes are set as the predetermined passcode;
   wherein the pressure level of the touch is classified into at least two levels;
   wherein the pressure level set for at least one node of the plurality of nodes is different from the pressure level set for the other nodes;
   wherein a touch order of the touched nodes among the plurality of nodes is not set as the predetermined passcode; and
   wherein when a combination of a touch position of the touched nodes and the pressure level matches that of the predetermined passcode regardless of the touch order, the controller generates the first control signal.

2. The touch input device of claim 1, wherein shapes of at least two of the plurality of nodes are different from each other.

3. The touch input device of claim 2, wherein the controller generates a second control signal for a feedback according to the pressure level of the touch, and wherein the feedback on each of the pressure levels of the touch is uncorrelated with the pressure level.

4. The touch input device of claim 1, wherein a position or shape of at least one of the plurality of nodes is set by a user.

5. The touch input device of claim 4, wherein the controller generates a second control signal for a feedback according to the pressure level of the touch, and wherein the feedback on each of the pressure levels of the touch is uncorrelated with the pressure level.

6. The touch input device of claim 1, wherein the pressure level of the touch is calculated on the basis of a capacitance change amount which is generated from a touch sensing module included in the touch screen.

7. The touch input device of claim 1, wherein the memory further stores a relation between the pressure level of the touch and a capacitance change amount which is generated from a touch sensing module included in the touch screen, and wherein the pressure level of the touch is determined with reference to the memory.

8. The touch input device of claim 1, wherein the controller generates a second control signal for a feedback according to the pressure level of the touch, and wherein the feedback on each of the pressure levels of the touch is uncorrelated with the pressure level.

9. A method for unlocking a passcode in a touch input device in accordance with a touch pressure, the method comprising:
    displaying a passcode input window on a touch screen;
    determining a pressure level of a touch on the passcode input window; and
    generating a first control signal as to whether or not the touch on the passcode input window matches a predetermined passcode;
    wherein the passcode input window comprises a plurality of nodes which are disposed in different positions on a background image displayed on the touch screen;
    wherein a number of touched nodes among the plurality of nodes and the pressure level of the touch on each of the touched nodes among the plurality of nodes are set as the predetermined passcode;
    wherein the pressure level of the touch is classified into at least two levels; and
    wherein the pressure level set for at least one node of the plurality of nodes is different from the pressure level set for the other nodes;
    wherein a touch order of the touched nodes among the plurality of nodes is not set as the predetermined passcode; and
    wherein in the generating the first control signal, when a combination of a touch position of the touched nodes and the pressure level matches that of the predetermined passcode regardless of the touch order, the first control signal is generated.

10. The method of claim 9, wherein shapes of at least two of the plurality of nodes are different from each other.

11. The method of claim 10, further comprising, after the determining of the pressure level of the touch before the generating of the first control signal,
    generating a second control signal for a feedback according to the pressure level; and
    performing the feedback in accordance with the second control signal;
    wherein the feedback on each of the pressure levels of the touch is uncorrelated with the pressure level.

12. The method of claim 9, wherein a position or shape of at least one of the plurality of nodes is set by a user.

13. The method of claim 9, wherein the pressure level of the touch is calculated on the basis of a capacitance change amount which is generated from a touch sensing module included in the touch screen.

14. The method of claim 9, wherein the determining the pressure level of the touch is performed by making reference to a memory which stores a relation between the pressure level of the touch and a capacitance change amount which is generated from a touch sensing module included in the touch screen.

15. The method of claim 9, further comprising, after the determining of the pressure level of the touch before the generating of the first control signal,
    generating a second control signal for a feedback according to the pressure level; and
    performing the feedback in accordance with the second control signal;
    wherein the feedback on each of the pressure levels of the touch is uncorrelated with the pressure level.

16. The method of claim 9, further comprising, after the determining of the pressure level of the touch before the generating of the first control signal,
    generating a second control signal for a feedback according to the pressure level; and
    performing the feedback in accordance with the second control signal;
    wherein the feedback on each of the pressure levels of the touch is provided such that the pressure level corresponding to the feedback is not recognizable from the feedback by a third party except for a user of the touch input device.

* * * * *